(12) United States Patent  (10) Patent No.: US 7,479,363 B2
Mishima et al.  (45) Date of Patent: *Jan. 20, 2009

(54) OPTICAL RECORDING MEDIUM AND METHOD FOR OPTICALLY RECORDING DATA IN THE SAME

(75) Inventors: Koji Mishima, Chuo-ku (JP); Masaki Aoshima, Chuo-ku (JP); Hiroyasu Inoue, Chuo-ku (JP); Hideki Hirata, Chuo-ku (JP); Hajime Utsunomiya, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/423,686

(22) Filed: Apr. 25, 2003

(65) Prior Publication Data

US 2003/0202452 A1  Oct. 30, 2003

(30) Foreign Application Priority Data

Apr. 26, 2002  (JP) ............................. 2002-126897

(51) Int. Cl.
  *G11B 7/24* (2006.01)
(52) U.S. Cl. ............... 430/270.12; 430/945; 369/288; 369/284; 426/64.4
(58) Field of Classification Search ................. 430/945, 430/270.12; 428/64.8; 369/275.5
  See application file for complete search history.

(56) References Cited

U.S. PATENT DOCUMENTS

| | | | |
|---|---|---|---|
| 3,959,799 A | * | 5/1976 | Gambino et al. ............ 430/524 |
| 4,357,616 A | | 11/1982 | Terao et al. .............. 346/135.1 |
| 4,405,706 A | | 9/1983 | Takahashi et al. ........... 430/271 |
| 4,477,819 A | * | 10/1984 | Lee et al. .................... 347/264 |
| 4,500,889 A | | 2/1985 | Wada et al. ................... 346/1.1 |
| 4,529,991 A | | 7/1985 | Wada et al. ............... 346/76 L |
| 4,587,533 A | | 5/1986 | Nakane et al. ........... 346/135.1 |

(Continued)

FOREIGN PATENT DOCUMENTS

CN  1330368  *  1/2002

(Continued)

OTHER PUBLICATIONS

Yoshii et al., "Investigation of hole formation on Cr/Al, Si/Al and C/Al bilayer films by laser irradiation", J. Appl. Phys., vol. 55(1) pp. 223-229 (Jan. 1984).*

(Continued)

*Primary Examiner*—Martin J Angebranndt
(74) *Attorney, Agent, or Firm*—Seed IP Law Group PLLC

(57) ABSTRACT

An optical recording medium includes a substrate, a first recording layer formed on the substrate and containing an element selected from the group consisting of Si, Ge, C, Sn, Zn and Cu as a primary component, and a second recording layer located in the vicinity of the first recording layer and containing Al as a primary component, the optical recording medium being constituted to be irradiated by a laser beam projected onto the side opposite from the substrate and the total thickness of the first recording layer and the second recording layer being equal to or thinner than 40 nm. According to the thus constituted optical recording medium, it is possible to decrease a noise level and improve a C/N ratio in a reproduced signal.

13 Claims, 8 Drawing Sheets

(a)

(b)

U.S. PATENT DOCUMENTS

| | | | | |
|---|---|---|---|---|
| 4,609,611 | A | 9/1986 | Sigyo et al. | 430/270 |
| 4,647,947 | A | 3/1987 | Takeoka et al. | 346/135.1 |
| 4,670,345 | A | 6/1987 | Morimoto et al. | 428/411.1 |
| 4,682,321 | A | 7/1987 | Takaoka et al. | 369/284 |
| 4,771,413 | A * | 9/1988 | Nago | 369/118 |
| 4,772,897 | A * | 9/1988 | Ohkawa | 346/135.1 |
| 5,194,363 | A | 3/1993 | Yoshioka et al. | 430/271 |
| 5,208,088 | A | 5/1993 | Tominaga et al. | 428/64 |
| 5,297,132 | A | 3/1994 | Takano et al. | 369/284 |
| 5,325,351 | A | 6/1994 | Uchiyama et al. | 369/275.1 |
| 5,328,813 | A | 7/1994 | Strandjord et al. | 430/321 |
| 5,401,330 | A | 3/1995 | Saito et al. | 136/259 |
| 5,414,451 | A | 5/1995 | Sugiyama et al. | 347/224 |
| 5,458,941 | A * | 10/1995 | Hintz | 428/64.4 |
| 5,459,018 | A | 10/1995 | Akahira | 430/270 |
| 5,511,057 | A | 4/1996 | Holtslag et al. | 369/94 |
| 5,560,998 | A | 10/1996 | Oyamatsu et al. | 428/694 ML |
| 5,583,643 | A | 12/1996 | Gass et al. | 356/445 |
| 5,656,370 | A | 8/1997 | Murakami et al. | 428/332 |
| 5,745,467 | A | 4/1998 | Sakaue et al. | 369/116 |
| 5,818,808 | A | 10/1998 | Takada et al. | 369/116 |
| 5,871,881 | A | 2/1999 | Nishida et al. | 430/270.11 |
| 5,875,169 | A | 2/1999 | Hatwar | 369/272 |
| 5,912,104 | A | 6/1999 | Hirotsune et al. | 430/270.13 |
| 5,948,496 | A | 9/1999 | Kinoshita et al. | 428/64.1 |
| 5,949,747 | A | 9/1999 | Miyashita et al. | 369/54 |
| 5,958,649 | A | 9/1999 | Hirotsune et al. | 430/270.13 |
| 6,033,752 | A | 3/2000 | Suzuki et al. | 428/64.1 |
| 6,096,399 | A | 8/2000 | Yoshinari et al. | 428/64.1 |
| 6,111,851 | A | 8/2000 | Ohki et al. | 369/286 |
| 6,143,469 | A | 11/2000 | Ohta et al. | 430/270.13 |
| 6,187,406 | B1 | 2/2001 | Ichihara et al. | 428/64.1 |
| 6,188,656 | B1 | 2/2001 | Shoji et al. | 369/48 |
| 6,210,860 | B1 | 4/2001 | Fukano et al. | 430/270.12 |
| 6,221,455 | B1 | 4/2001 | Yasuda et al. | 428/64.1 |
| 6,231,945 | B1 | 5/2001 | Miyamoto et al. | 429/64.1 |
| 6,245,404 | B1 | 6/2001 | Saito et al. | 428/64.1 |
| 6,254,966 | B1 | 7/2001 | Kondo | 428/156 |
| 6,266,299 | B1 | 7/2001 | Oshima et al. | 369/13 |
| 6,278,680 | B1 | 8/2001 | Miyauchi et al. | 369/112.01 |
| 6,333,913 | B1 | 12/2001 | Yoshinari et al. | 369/112.01 |
| 6,345,026 | B1 | 2/2002 | Furukawa et al. | 369/59.11 |
| 6,355,326 | B1 | 3/2002 | Lee et al. | 428/64.1 |
| 6,404,712 | B1 | 6/2002 | Lee et al. | 369/47.53 |
| 6,404,713 | B1 | 6/2002 | Ueki | 369/47.53 |
| 6,416,837 | B1 | 7/2002 | Kojima et al. | 428/64.1 |
| 6,449,239 | B1 | 9/2002 | Uno et al. | 369/275.1 |
| 6,511,788 | B1 | 1/2003 | Yasuda et al. | 430/270.13 |
| 6,528,138 | B2 | 3/2003 | Meinders et al. | 428/64.1 |
| 6,551,679 | B1 | 4/2003 | Kuroda et al. | 428/64.1 |
| 6,608,799 | B2 | 8/2003 | Hozumi | 369/13.26 |
| 6,611,481 | B1 | 8/2003 | Koishi et al. | 369/47.53 |
| 6,636,477 | B1 | 10/2003 | Miyamoto et al. | 369/286 |
| 6,656,559 | B2 | 12/2003 | Mizushima et al. | 428/64.1 |
| 6,660,451 | B1 | 12/2003 | Sakaue et al. | 430/270.13 |
| 6,670,014 | B2 | 12/2003 | Nishihara et al. | 428/64.1 |
| 6,699,591 | B2 | 3/2004 | Ishida et al. | 428/641 |
| 6,741,547 | B2 | 5/2004 | Tomura et al. | 369/275.4 |
| 6,751,184 | B2 | 6/2004 | Kojima et al. | 369/275.2 |
| 6,788,635 | B1 | 9/2004 | Aratani et al. | 369/100 |
| 6,791,926 | B1 | 9/2004 | Furumiya et al. | 369/53.13 |
| 6,805,935 | B2 | 10/2004 | Ashida et al. | 428/64.1 |
| 6,807,142 | B1 | 10/2004 | Nagata et al. | 369/275.2 |
| 6,841,218 | B2 | 1/2005 | Hosoda et al. | 428/64.1 |
| 6,929,840 | B2 | 8/2005 | Hosoda et al. | 428/64.1 |
| 6,982,111 | B2 | 1/2006 | Mizushima et al. | 428/64.1 |
| 6,986,152 | B2 | 1/2006 | Takemoto et al. | 720/718 |
| 6,996,055 | B2 * | 2/2006 | Mishima et al. | 369/283 |
| 7,002,887 | B2 | 2/2006 | Kakiuchi et al. | 369/5.12 |
| 7,006,419 | B2 | 2/2006 | Yokoi | 369/59.11 |
| 7,018,694 | B2 | 3/2006 | Hosoda et al. | 428/64.1 |
| 7,130,256 | B2 | 10/2006 | Toda et al. | 369/59.11 |
| 7,142,496 | B2 | 11/2006 | Miyagawa et al. | 369/59.11 |
| 7,154,844 | B2 | 12/2006 | Usami | 369/286 |
| 7,160,597 | B2 * | 1/2007 | Inoue et al. | 428/64.4 |
| 7,166,347 | B2 * | 1/2007 | Inoue et al. | 428/64.4 |
| 7,167,431 | B2 | 1/2007 | Miura et al. | 369/59.11 |
| 7,167,440 | B2 * | 1/2007 | Inoue et al. | 369/288 |
| 7,190,650 | B2 | 3/2007 | Fujiune et al. | 369/53.22 |
| 7,276,274 | B2 * | 10/2007 | Inoue et al. | 428/64.4 |
| 2001/0005343 | A1 | 6/2001 | Shoji et al. | 369/47.51 |
| 2001/0012257 | A1 | 8/2001 | Suzuki et al. | 369/94 |
| 2001/0017833 | A1 | 8/2001 | Yamada et al. | 369/59.11 |
| 2001/0021160 | A1 | 9/2001 | Shuy et al. | 369/100 |
| 2001/0041304 | A1 | 11/2001 | Uno et al. | 430/270.13 |
| 2001/0044002 | A1 | 11/2001 | Shingai et al. | 428/64.4 |
| 2001/0044073 | A1 | 11/2001 | Fukano et al. | 430/270.12 |
| 2002/0060979 | A1 | 5/2002 | Tsukuda et al. | 369/275.4 |
| 2002/0076646 | A1 | 6/2002 | Zhou et al. | 430/270.13 |
| 2002/0110063 | A1 | 8/2002 | Yamada et al. | 369/47.39 |
| 2002/0160306 | A1 | 10/2002 | Hanaoka et al. | 430/270.13 |
| 2002/0168587 | A1 | 11/2002 | Sakaue et al. | 430/270.13 |
| 2003/0086359 | A1 | 5/2003 | Lee et al. | 369/275.3 |
| 2003/0134229 | A1 | 7/2003 | Yasuda et al. | 430/270.13 |
| 2003/0165111 | A1 | 9/2003 | Flynn | 369/288 |
| 2003/0190551 | A1 * | 10/2003 | Aoshima et al. | 430/270.12 |
| 2003/0224215 | A1 | 12/2003 | Kondo et al. | 428/694 |
| 2003/0228539 | A1 | 12/2003 | Hosoda et al. | 430/270.13 |
| 2003/0231577 | A1 * | 12/2003 | Mishima et al. | 369/283 |
| 2004/0001418 | A1 | 1/2004 | Shinotsuka et al. | 369/111 |
| 2004/0013069 | A1 | 1/2004 | Uno et al. | 369/59.11 |
| 2004/0018334 | A1 | 1/2004 | Nee | 428/64.1 |
| 2004/0027652 | A1 | 2/2004 | Erdogan et al. | 359/359 |
| 2004/0027973 | A1 | 2/2004 | Aoshima et al. | 369/121 |
| 2004/0038080 | A1 * | 2/2004 | Inoue et al. | 428/694 SC |
| 2004/0052176 | A1 | 3/2004 | Narumi et al. | 369/47.39 |
| 2004/0052194 | A1 | 3/2004 | Inoue et al. | 369/112.23 |
| 2004/0076073 | A1 * | 4/2004 | Inoue et al. | 430/270.12 |
| 2004/0110086 | A1 | 6/2004 | Kakiuchi et al. | 430/270.12 |
| 2004/0139459 | A1 | 7/2004 | Mishima et al. | 720/718 |
| 2004/0152016 | A1 | 8/2004 | Mishima et al. | 430/270.12 |
| 2004/0157158 | A1 | 8/2004 | Kakiuchi et al. | 430/270.12 |
| 2004/0174796 | A1 | 9/2004 | Mizushima et al. | 369/94 |
| 2004/0174804 | A1 | 9/2004 | Kakiuchi et al. | 369/275.4 |
| 2004/0190435 | A1 | 9/2004 | Hosoda et al. | 369/283 |
| 2004/0191685 | A1 | 9/2004 | Kakiuchi et al. | 430/270.11 |
| 2004/0202097 | A1 * | 10/2004 | Oyake et al. | 369/283 |
| 2004/0241581 | A1 | 12/2004 | Kakiuchi et al. | 430/270.12 |
| 2005/0018590 | A1 * | 1/2005 | Inoue et al. | 369/275.2 |
| 2005/0018591 | A1 | 1/2005 | Inoue et al. | 369/275.2 |
| 2005/0018592 | A1 * | 1/2005 | Inoue et al. | 369/275.2 |
| 2005/0047301 | A1 | 3/2005 | Inoue et al. | 369/94 |
| 2005/0047302 | A1 * | 3/2005 | Inoue et al. | 369/94 |
| 2005/0047303 | A1 | 3/2005 | Inoue et al. | 369/94 |
| 2005/0047304 | A1 | 3/2005 | Inoue et al. | 369/94 |
| 2005/0047305 | A1 * | 3/2005 | Inoue et al. | 369/94 |
| 2005/0047306 | A1 | 3/2005 | Inoue et al. | 369/94 |
| 2005/0048249 | A1 * | 3/2005 | Inoue et al. | 428/64.4 |
| 2005/0052194 | A1 | 3/2005 | Kister et al. | 324/755 |
| 2005/0074306 | A1 | 4/2005 | Montresor | 409/179 |
| 2005/0094526 | A1 | 5/2005 | Kakiuchi et al. | 369/59.11 |
| 2005/0243676 | A1 | 11/2005 | Kato et al. | 369/59.11 |
| 2006/0013111 | A1 | 1/2006 | Inoue et al. | 369/125 |
| 2006/0078825 | A1 * | 4/2006 | Inoue et al. | 430/270.12 |

FOREIGN PATENT DOCUMENTS

| | | |
|---|---|---|
| CN | 1365108 A | 8/2002 |
| DE | 37 41 910 | 6/1988 |
| EP | 0 068 801 B1 | 9/1986 |
| EP | 0 474 311 A1 | 3/1992 |
| EP | 0 350 078 B1 | 3/1994 |
| EP | 822543 * | 2/1998 |
| EP | 0 978 831 A2 | 2/2000 |

| | | | | | | |
|---|---|---|---|---|---|---|
| EP | 1 028 421 | A2 | 8/2000 | JP | 2000-187842 | 7/2000 |
| EP | 1 122 723 | | 8/2001 | JP | 2000-187884 * | 7/2000 |
| EP | 1 154 413 | A2 | 11/2001 | JP | 2000187842 A | 7/2000 |
| EP | 1 172 811 | A2 | 1/2002 | JP | 2000-222764 | 8/2000 |
| EP | 1 178 472 | A2 | 2/2002 | JP | 2000-276736 | 10/2000 |
| EP | 1 215 669 | A2 | 6/2002 | JP | 2000-285509 | 10/2000 |
| EP | 0 947 351 | B1 | 9/2002 | JP | 2000-297365 | 10/2000 |
| EP | 1 351 230 | A2 | 10/2003 | JP | 2001005350 A | 1/2001 |
| EP | 1 139 340 | B1 | 6/2004 | JP | 2001067719 A | 3/2001 |
| EP | 11437724 | B1 | 9/2006 | JP | 2001-101709 | 4/2001 |
| GB | 2 336 463 | | 10/1999 | JP | 2001-143265 | 5/2001 |
| JP | 48-38 | | 1/1973 | JP | 2001-222819 | 8/2001 |
| JP | 54-133134 | | 10/1979 | JP | 2001-243655 | 9/2001 |
| JP | 56-124134 | | 9/1981 | JP | 2001-266402 | 9/2001 |
| JP | 57-22095 | | 2/1982 | JP | 2001291273 A | 10/2001 |
| JP | 57-27788 | | 2/1982 | JP | 2001-322357 | 11/2001 |
| JP | 58-220794 | | 12/1983 | JP | 2001-344823 | 12/2001 |
| JP | 59-225992 | | 12/1984 | JP | 2002-15426 | 1/2002 |
| JP | 60-160036 | * | 8/1985 | JP | 2002050076 A | 2/2002 |
| JP | 60-219097 | | 11/1985 | JP | 2002074742 A | 3/2002 |
| JP | 62016193 | A | 1/1987 | JP | 2002-104317 | 4/2002 |
| JP | 62-28941 | | 2/1987 | JP | 2002-120458 | 4/2002 |
| JP | 62-204442 | | 9/1987 | JP | 2002-150563 | 5/2002 |
| JP | 62-226440 | | 10/1987 | JP | 2002-237037 | 8/2002 |
| JP | 62-226442 | | 10/1987 | JP | 2002-269808 | 9/2002 |
| JP | 62-245545 | | 10/1987 | JP | 2002-329348 | 11/2002 |
| JP | 63-299984 | | 12/1988 | JP | 2003-13201 | 1/2003 |
| JP | 63299984 | A | 12/1988 | JP | 2003013201 A | 1/2003 |
| JP | 1-158633 | | 6/1989 | JP | 2003-054135 * | 2/2003 |
| JP | 1191351 | A | 8/1989 | JP | 2003-77185 | 3/2003 |
| JP | 1-270528 | | 10/1989 | JP | 2003-85778 | 3/2003 |
| JP | 2-152029 | | 6/1990 | JP | 2003077185 A | 3/2003 |
| JP | 3-5929 | | 1/1991 | JP | 2003-105738 | 4/2003 |
| JP | 3-49054 | | 3/1991 | JP | 2003-178448 | 6/2003 |
| JP | 3-258590 | | 11/1991 | JP | 2003-260874 | 9/2003 |
| JP | 4-86283 | | 3/1992 | JP | 2003-263777 | 9/2003 |
| JP | 4-226784 | | 8/1992 | JP | 2003-326848 | 11/2003 |
| JP | 4-226785 | | 8/1992 | JP | 2004-20822 | 1/2004 |
| JP | 4-298389 | | 10/1992 | JP | 2004-30891 | 1/2004 |
| JP | 5-159358 | | 6/1993 | JP | 2004020822 A | 1/2004 |
| JP | 5-169819 | | 7/1993 | JP | 2004030891 A | 1/2004 |
| JP | 05262040 | A | 10/1993 | JP | 2004-39177 | 2/2004 |
| JP | 5-342631 | | 12/1993 | JP | 2004-87073 | 3/2004 |
| JP | 5-342635 | | 12/1993 | JP | 2004-111004 | 4/2004 |
| JP | 06106856 | A | 4/1994 | JP | 2004111004 A | 4/2004 |
| JP | 06-171236 | * | 6/1994 | JP | 2004-158134 | 6/2004 |
| JP | 6-243507 | | 9/1994 | WO | 98/28735 | 2/1998 |
| JP | 6-262854 | | 9/1994 | WO | WO 01/93256 A1 | 12/2001 |
| JP | 6243507 | A | 9/1994 | WO | WO 02/29787 A1 | 4/2002 |
| JP | 7-129959 | | 5/1995 | WO | WO 03/025924 | 3/2003 |
| JP | 7-225947 | | 8/1995 | | | |
| JP | 7-235465 | | 9/1995 | | | |
| JP | 8-124165 | | 5/1996 | | | |
| JP | 8124165 | A | 5/1996 | | | |
| JP | 9-7176 | | 1/1997 | | | |
| JP | 09066669 | A | 3/1997 | | | |
| JP | 10-76755 | | 3/1998 | | | |
| JP | 10-143919 | | 5/1998 | | | |
| JP | 10226173 | A | 8/1998 | | | |
| JP | 11073692 | A | 3/1999 | | | |
| JP | 11167743 | A | 6/1999 | | | |
| JP | 11227334 | A | 8/1999 | | | |
| JP | 11328740 | A | 11/1999 | | | |

OTHER PUBLICATIONS

Machine translation of JP 10-076756.*
Inoue, H., et al., "Inorganic Write-Once Disc for High Speed Recording," Jpn. J. Appl. Phys. vol. 42, part 1, No. 2B, pp. 1059-1061, Feb. 2003.
Narumi, K. et al., "45GB Rewritable Dual-Layer Phase-Change Optical Disk With A Transmittance Balanced Structure," Technical Digest, International Symposium on Optical Memory 2001, Grand Hotel, Taipei, Taiwan, Oct. 16-19, 2001, pp. 202 & 203.
Nikkei Electronics, May 12, 2003, pp. 119-133, "Blu-ray Disc".

* cited by examiner

FIG. 2
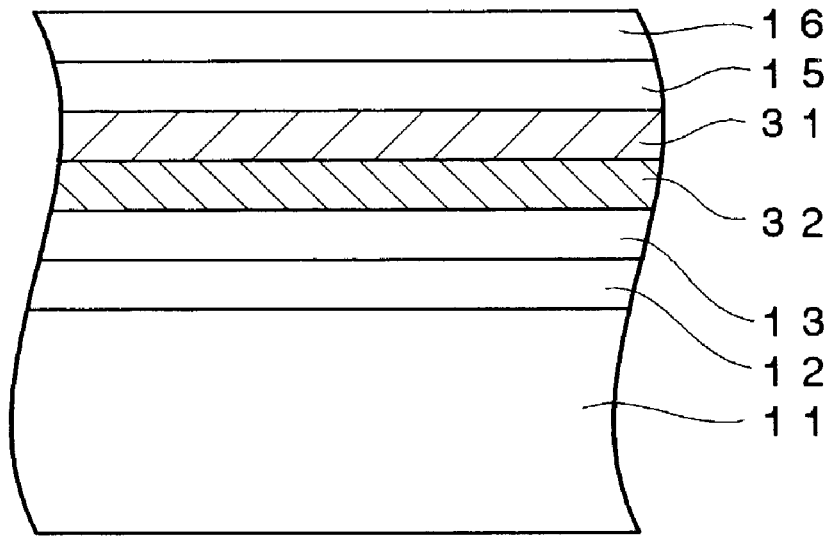
(a)
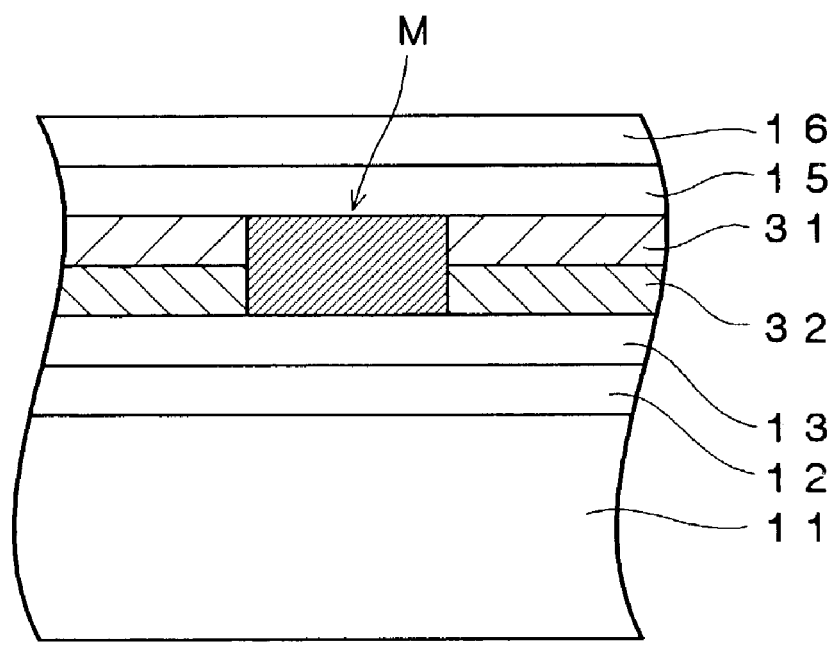
(b)

OPTICAL RECORDING MEDIUM AND METHOD FOR OPTICALLY RECORDING DATA IN THE SAME

BACKGROUND OF THE INVENTION

The present invention relates to an optical recording medium and a method for optically recording data in the optical recording medium and, particularly, to an optical recording medium constituted so as to record data therein and reproduce data therefrom by projecting a laser beam onto the side opposite from a substrate, which includes two or more recording layers and is capable of decreasing noise level and improving C/N ratio of a reproduced signal, and a method for optically recording data in the same.

DESCRIPTION OF THE PRIOR ART

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using prepits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, which change may be accompanied by physical deformation.

However, since an organic dye is degraded when exposed to sunlight or the like, it is difficult to improve long-time storage reliability in the case where an organic dye is used as the material of the recording layer. Therefore, it is desirable for improving long-time storage reliability of the write-once type optical recording medium to form the recording layer of a material other than an organic dye.

As disclosed in Japanese Patent Application Laid Open No. 62-204442, an optical recording material formed by laminating two recording layers is known as an example of an optical recording medium whose recording layer is formed of a material other than an organic dye.

On the other hand, a next-generation type optical recording medium that offers improved recording density and has an extremely high data transfer rate has been recently proposed.

In such a next-generation type optical recording medium, the achievement of increased recording capacity and extremely high data transfer rate inevitably requires the diameter of the laser beam spot used to record and reproduce data to be reduced to a very small size.

In order to reduce the laser beam spot diameter, it is necessary to increase the numerical aperture of the objective lens for condensing the laser beam to 0.7 or more, for example, to about 0.85, and to shorten the wavelength of the laser beam to 450 nm or less, for example, to about 400 nm.

However, if the numerical aperture of the objective lens for condensing the laser beam is increased, then, as shown by Equation (1), the permitted tilt error of the optical axis of the laser beam to the optical recording medium, namely, the tilt margin T, has to be greatly decreased.

$$T \propto \frac{\lambda}{d \cdot NA^3} \quad (1)$$

In Equation (1), $\lambda$ is the wavelength of the laser beam used for recording and reproducing data and d is the thickness of the light transmission layer through which the laser beam transmits.

As apparent from Equation (1), the tilt margin T decreases as the numerical aperture of the objective lens increases and increases as the thickness of the light transmission layer decreases. Therefore, decrease of the tilt margin T can be effectively prevented by making the thickness of the light transmission layer thinner.

On the other hand, a wave aberration coefficient W representing coma is defined by Equation (2).

$$W = \frac{d \cdot (n^2 - 1) \cdot n^2 \cdot \sin\theta \cdot \cos\theta \cdot (NA)^3}{2\lambda(n^2 - \sin^2\theta)^{\frac{5}{2}}} \quad (2)$$

In Equation (2), n is the refractive index of the light transmission layer and $\theta$ is the tilt of the optical axis of the laser beam.

As apparent from Equation (2), coma can also be very effectively suppressed by making the thickness of the light transmission layer thinner.

For these reasons, it has been proposed that the thickness of the light transmission layer of the next-generation type optical recording medium should be reduced as far as about 100 µm in order to ensure sufficient tilt margin and suppress coma.

As a result, it becomes difficult to form a layer such as a recording layer on the light transmission layer as is done in conventional optical recording media such as the CD and DVD. This led to the proposal that the light transmission layer be constituted as a thin resin layer formed by spin coating or the like on a recording layer or other such layer formed on a substrate.

Accordingly, although layers are sequentially formed from the side of the light incidence surface in a conventional optical recording medium, they are sequentially formed from the side opposite from the light incidence surface in a next-generation optical recording medium.

Since layers are sequentially formed from the side opposite from the light incidence surface in a next-generation optical recording medium, in the case where two recording layers are formed on a substrate, the noise level of the reproduced signal tends to be increased and the C/N ratio tends to be lowered.

On the other hand, increasing concern about global atmospheric problems further makes it necessary to fabricate optical recording media with materials put minimal load on the environment.

SUMMARY OF THE INVENTION

It is therefore an object of the present invention to provide an optical recording medium constituted so as to record data therein and reproduce data therefrom by projecting a laser beam onto the side opposite from a substrate, which includes two or more recording layers and is capable of decreasing noise level and improving C/N ratio of a reproduced signal.

It is another object of the present invention to provide an optical recording medium which can be fabricated with materials that put minimal load on the environment and has high long-term storage reliability.

It is a further object of the present invention to provide a method for optically recording data in an optical recording medium, which decreases noise level and improves C/N ratio of a reproduced signal.

The inventors of the present invention vigorously pursued a study for accomplishing the above objects and, as a result, made the surprising discovery that when a laser beam is used to record data in an optical recording medium composed of a first recording layer containing an element selected from the group consisting of Si, Ge, C, Sn, Zn and Cu as a primary component and a second recording layer containing Al as a primary component and formed in the vicinity of the first recording layer so that the total thickness of the first recording layer and the second recording layer is equal to or thinner than 40 nm, a mixed region including both the primary component element of the first recording layer and the primary component element of the second recording layer is formed to markedly change the region's reflection coefficient and enable data to be recorded with high sensitivity. They further discovered that the noise level of a reproduced signal can be decreased to improve C/N ratio by utilizing the large difference in reflection coefficient between the mixed region including the primary component element of the first recording layer and the primary component element of the second recording layer, and the other regions.

The above and other objects of the present invention can therefore be accomplished by an optical recording medium comprising a substrate, a first recording layer formed on the substrate and containing an element selected from the group consisting of Si, Ge, C, Sn, Zn and Cu as a primary component, and a second recording layer located in the vicinity of the first recording layer and containing Al as a primary component, the optical recording medium being constituted to be irradiated by a laser beam projected onto the side opposite from the substrate and the total thickness of the first recording layer and the second recording layer being equal to or thinner than 40 nm.

In the present invention, the statement that the first recording layer contains a certain element as a primary component means that the content of the element is maximum among the elements contained in the first recording layer, while the statement that the second recording layer contains Al as a primary component means that the content of Al is maximum among the elements contained in the second recording layer.

In the present invention, it is not absolutely necessary for the second recording layer to be in contact with the first recording layer and it is sufficient for the second recording layer to be so located in the vicinity of the first recording layer as to enable formation of a mixed region including the primary component element of the first recording layer and the primary component element of the second recording layer when the region is irradiated with a laser beam. Further, one or more other layers such as a dielectric layer may be interposed between the first recording layer and the second recording layer.

In the present invention, it is preferable to form the second recording layer so as to be in contact with the first recording layer.

In the present invention, the optical recording medium may include one or more recording layers containing an element selected from the group consisting of Si, Ge, C, Sn, Zn and Cu as a primary component or one or more recording layers containing Al as a primary element, in addition to the first recording layer and the second recording layer.

Although the reason why a mixed region including the primary component element of the first recording layer and the primary component element of the second recording layer can be formed when irradiated with a-laser beam is not altogether clear, it is reasonable to conclude that the primary component elements of the first and second recording layers are partially or totally fused or diffused, thereby forming a region where the primary component elements of the first and second recording layers mix.

The reflection coefficient that the region thus formed by mixing the primary component elements of the first and second recording layers exhibits with respect to a laser beam for reproducing data and the reflection coefficient that other regions exhibit with respect to the laser beam for reproducing data are considerably different and, therefore, recorded data can be reproduced with high sensitivity by utilizing such large difference in the reflection coefficients.

In an optical recording medium constituted to be irradiated by a laser beam projected from the side of a substrate formed by injection molding to have excellent surface smoothness, if a first recording layer and a second recording layer are sequentially formed on the substrate by a gas phase growth process, the first recording layer, which is contact with the smooth surface of the substrate and on which the laser beam impinges, will also have excellent surface smoothness. The noise level of a reproduced signal is therefore not increased. However, in an optical recording medium including a first recording layer and a second recording layer sequentially formed on a substrate by a gas phase growth process and constituted to be irradiated by a laser beam projected onto the side opposite from the substrate, the laser beam impinges on the surface of the second recording layer, which has poor surface smoothness because it is formed by a gas phase growth process on the first recording layer that is formed on the substrate by a gas phase growth process and has poor surface smoothness. As a result, the noise level of a reproduced signal is increased and the C/N ratio decreased.

In particular, in a next-generation optical recording medium constituted so that data are recorded therein and reproduced therefrom using a laser beam having a short wavelength and an objective lens having a large numerical aperture, since the laser beam spot impinging on the surface of the second recording layer is too small, the noise level of a reproduced signal and, therefore, the C/N ratio are greatly affected by the smoothness of the surface of the second recording layer. Therefore, when the smoothness of the surface of the second recording layer is poor, the noise level of a reproduced signal is greatly increased and the C/N ratio is markedly decreased.

Furthermore, it is difficult to form a recording layer containing Al as a primary component so as to have good surface smoothness and, therefore, the noise level of the reproduced signal tends to be greatly increased and the C/N ratio tends to be markedly decreased in an optical recording medium including the second recording layer containing Al as a primary component.

However, according to the present invention, since the first recording layer and the second recording layer are formed so that the total thickness thereof is equal to or thinner than 40 nm, the smoothness of the surface of the second recording layer on which the laser beam impinges can be improved and, therefore, it is possible to effectively prevent the noise level of the reproduced signal from being increased, thereby preventing the C/N ratio from being lowered.

Moreover, the inventors found that the aforesaid elements put only a light load on the environment and that since Al is an inexpensive material, the cost of the optical recording medium can be lowered.

The above and other objects of the present invention can be also accomplished by a method for optically recording data comprising a step of projecting a laser beam of predetermined power onto the side opposite from a substrate of an optical recording medium comprising the substrate, a first recording layer formed on the substrate and containing an element selected from the group consisting of Si, Ge, C, Sn, Zn and Cu as a primary component, and a second recording layer located in the vicinity of the first recording layer and containing Al as a primary component, the optical recording medium being constituted to be irradiated by a laser beam projected onto the side opposite from the substrate and the total thickness of the first recording layer and the second recording layer being equal to or thinner than 40 nm.

In the present invention, it is preferable to form the second recording layer so as to be in contact with the first recording layer.

In the present invention, the first recording layer and the second recording layer are preferably formed so that a total thickness thereof is 2 nm to 40 nm, more preferably, 2 nm to 30 nm, most preferably, 2 nm to 20 nm.

In the present invention, it is particularly preferable that the first recording layer contains Si as a primary component.

In the present invention, instead of an element selected from the group consisting of Si, Ge, C, Sn, Zn and Cu, the first recording layer may contain an element selected from the group consisting of Au, B, Mg, Ti, Mn, Fe, Ga, Zr and Pt as a primary component.

In the present invention, it is preferable that at least one kind of an element selected from the group consisting of Mg, Au, Ti and Cu is added to the second recording layer. In the case where at least one kind of an element selected from the group consisting of Mg, Au, Ti and Cu is added to the second recording layer, it is possible to further decrease a noise level in a reproduced signal and improve a long term storage reliability.

In a preferred aspect of the present invention, an optical recording medium further comprises a light transmission layer provided on a side opposite to the substrate with respect to the first recording layer and the second recording layer, a first dielectric layer provided between the light transmission layer and the first recording layer and the second recording layer, and a second dielectric layer provided between the first recording layer and the second recording layer and the substrate.

According to this preferred aspect of the present invention, it is possible to reliably prevent the substrate or the light transmission layer from being deformed by heat when data is recorded therein by irradiation with a laser beam. Further, according to this preferred aspect of the present invention, since it is possible to prevent Al contained in the second recording layer as a primary component from being corroded, recorded data can be more effectively prevented from being degraded over the long term.

In a further preferred aspect of the present invention, an optical recording medium further comprises a reflective layer provided between the substrate and the second dielectric layer.

According to this preferred aspect of the present invention, it is possible to increase the difference in reflection coefficient between a recorded region and an unrecorded region by a multiple interference effect, thereby obtaining a higher reproduced signal (C/N ratio).

In a preferred aspect of the present invention, the method for optically recording data includes a step of projecting a laser beam having a wavelength of 450 nm or shorter onto the optical recording medium, thereby recording data in the first recording layer and the second recording layer.

In a further preferred aspect of the present invention, the method for optically recording data includes the steps of employing an objective lens and a laser beam whose numerical aperture NA and wavelength λ satisfy λ/NA≦640 nm, and projecting the laser beam onto the optical recording medium via the objective lens, thereby recording data in the first recording layer and the second recording layer.

According to this preferred aspect of the present invention, since it is possible to reduce the beam spot of the laser beam projected onto the optical recording medium, the recording density of data can be markedly improved.

The above and other objects and features of the present invention will become apparent from the following description made with reference to the accompanying drawings.

BRIEF DESCRIPTION OF THE DRAWINGS

FIG. 2(a) is a schematic enlarged cross-sectional view of the optical recording medium shown in FIG. 1.

FIG. 2(b) is a schematic enlarged cross-sectional view showing an optical recording medium after data have been recorded therein.

DESCRIPTION OF THE PREFERRED EMBODIMENTS

Figure 1:
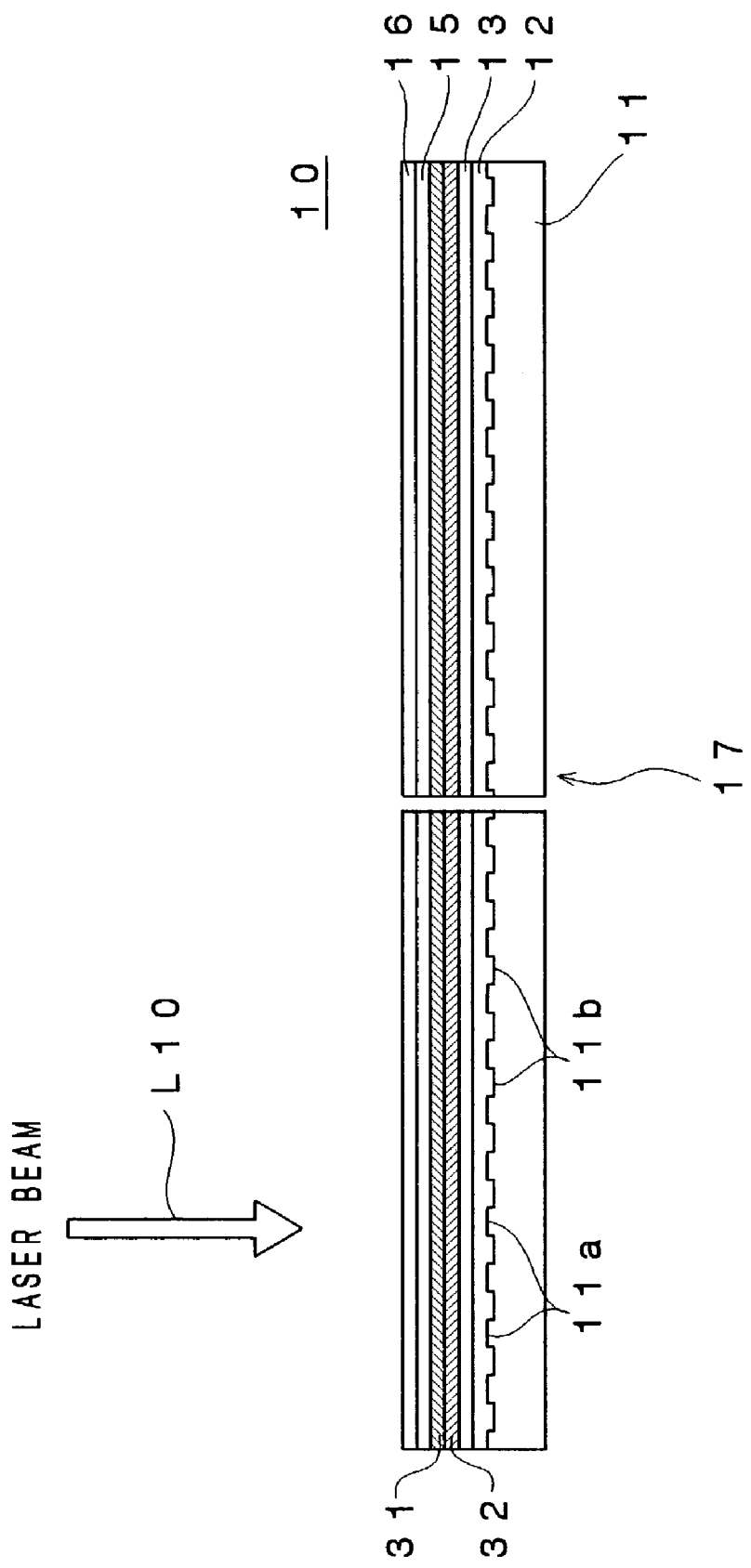
FIG. 1 is a schematic cross-sectional view showing the structure of an optical recording medium that is a preferred embodiment of the present invention.

FIG. 1 is a schematic cross-sectional view showing the structure of an optical recording medium that is a preferred embodiment of the present invention.

As shown in FIG. 1, an optical recording medium 10 according to this embodiment is constituted as a write-once type optical recording medium and includes a substrate 11, a reflective layer 12 formed on the surface of the substrate 11, a second dielectric layer 13 formed on the surface of the reflective layer 12, a second recording layer 32 formed on the surface of the second dielectric layer 13, a first recording layer 31 formed on the surface of the second recording layer 32, a first dielectric layer 15 formed on the surface of the first recording layer 31 and a light transmission layer 16 formed on the surface of the first dielectric layer 15.

As shown in FIG. 1, a center hole is formed at a center portion of the optical recording medium 10.

In this embodiment, as shown in FIG. 1, a laser beam L10 is projected onto the surface of the light transmission layer 16, thereby recording data in the optical recording medium 10 or reproducing data from the optical recording medium 10.

The substrate 11 serves as a support for ensuring mechanical strength required for the optical recording medium 10.

The material used to form the substrate 11 is not particularly limited insofar as the substrate 11 can serve as the support of the optical recording medium 10. The substrate 11 can be formed of glass, ceramic, resin or the like. Among these, resin is preferably used for forming the substrate 11 since resin can be easily shaped. Illustrative examples of resins suitable for forming the substrate 40 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 11 from the viewpoint of easy processing, optical characteristics and the like.

In this embodiment, the substrate 11 has a thickness of about 1.1 mm.

The shape of the substrate 11 is not particularly limited but is normally disk-like, card-like or sheet-like.

As shown in FIG. 1, grooves 11a and lands 11b are alternately formed on the surface of the substrate 11. The grooves 11a and/or lands 11b serve as a guide track for the laser beam L10 when data are to be recorded or when data are to be reproduced.

The reflective layer 12 serves to reflect the laser beam L10 entering through the light transmission layer 16 so as to emit it from the light transmission layer 16.

The thickness of the reflective layer 12 is not particularly limited but is preferably from 10 nm to 300 nm, more preferably from 20 nm to 200 nm.

The material used to form the reflective layer 12 is not particularly limited insofar as it can reflect a laser beam, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflection characteristic, such as Al, Au, Ag, Cu or alloy containing at least one of these metals, such as alloy of Al and Ti.

The reflective layer 12 is provided in order to increase the difference in reflection coefficient between a recorded region and an unrecorded region by a multiple interference effect when the laser beam L10 is used to optically reproduce data from the first recording layer 31 and the second recording layer 32, thereby obtaining a higher reproduced signal (C/N ratio).

The first dielectric layer 15 and the second dielectric layer 13 serve to protect the first recording layer 31 and the second recording layer 32. Degradation of optically recorded data can be prevented over a long period by the first dielectric layer 15 and the second dielectric layer 13. Further, since the second dielectric layer 13 also serves to prevent the substrate 11 and the like from being deformed by heat, it is possible to effectively prevent jitter and the like from becoming worse due to the deformation of the substrate 11 and the like.

The dielectric material used to form the first dielectric layer 15 and the second dielectric layer 13 is not particularly limited insofar as it is transparent and the first dielectric layer 15 and the second dielectric layer 13 can be formed of a dielectric material containing oxide, sulfide, nitride or a combination thereof, for example, as a primary component. More specifically, in order to prevent the substrate 11 and the like from being deformed by heat and thus protect the first recording layer 31 and the second recording layer 32, it is preferable for the first dielectric layer 15 and the second dielectric layer 13 to contain at least one kind of dielectric material selected from the group consisting of $Al_2O_3$, AlN, ZnO, ZnS, GeN, GeCrN, CeO, SiO, $SiO_2$, SiN and SiC as a primary component and it is more preferable for the first dielectric layer 15 and the second dielectric layer 13 to contain $ZnS.SiO_2$ as a primary component.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

In this specification, the statement that a dielectric layer contains a certain dielectric material as a primary component means that the dielectric material is maximum among dielectric materials contained in the dielectric layer. $ZnS.SiO_2$ means a mixture of ZnS and $SiO_2$.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the optical recording medium 10 owing to stress present in the first dielectric layers 15 and/or the second dielectric layer 13.

The first recording layer 31 and the second recording layer 32 are adapted for recording data therein. In this embodiment, the first recording layer 31 is disposed on the side of the light transmission layer 16 and the second recording layer 32 is disposed on the side of the substrate 11.

In this embodiment, the first recording layer 31 contains an element selected from the group consisting of Si, Ge, C, Sn, Zn and Cu as a primary component and the second recording layer 32 contains Al as a primary component.

In order to thoroughly improve the C/N ratio of the reproduced signal, it is particularly preferable for the first recording layer 31 to contain Si as a primary component.

In this embodiment, since the second recording layer 32 contains Al as a primary component, the reflectance of the second recording layer 32 is higher than that of the first recording layer 31 and, therefore, the recording sensitivity of the optical recording medium 10 can be improved.

Further, it is preferable to add at least one kind of an element selected from the group consisting of Mg, Au, Ti and Cu to the second recording layer 32 containing Al as a primary component. In the case where at least one kind of an element selected from the group consisting of Mg, Au, Ti and Cu is added to the second recording layer 32 containing Al as a primary component, the surface smoothness of the second recording layer 32 can be much more improved and the noise level of the reproduced signal can be further suppressed.

Furthermore, it is possible to improve the storage reliability and recording sensitivity of the optical recording medium 10 by adding at least one element selected from the group consisting of Mg, Au, Ti and Cu to the second recording layer 32 containing Al as a primary component.

Mg, Au, Ti and Cu put only a light load on the environment and, therefore, there is no risk of harm to the global atmosphere.

The amount of Mg, Au, Ti or Cu to be added to the second recording layer 32 is preferably equal to or more than 1 atomic % and less than 50 atomic %.

When Mg is added to the second recording layer 32, it is preferable to add Mg so that the amount thereof is equal to or more than 8 atomic % and less than 50 atomic %, and when Au is added to the second recording layer 32, it is preferable to add Au so that the amount thereof is equal to or more than 7 atomic % and less than 50 atomic %. On the other hand, when Ti is added to the second recording layer 32, it is preferable to add Ti so that the amount thereof is equal to or more than 1 atomic % and less than 50 atomic %, and when Cu is added to the second recording layer 32, it is preferable to add Cu so that the amount thereof is equal to or more than 9 atomic % and less than 50 atomic %.

The surface smoothness of the first recording layer 31 irradiated with the laser beam L10 becomes worse as the total thickness of the first recording layer 31 and the second recording layer 32 becomes thicker. As a result, the noise level of the reproduced signal becomes higher and the recording sensitivity is lowered. On the other hand, in the case where the total thickness of the first recording layer 31 and the second recording layer 32 is too small, the change in reflection coefficient between before and after irradiation with the laser beam L10 is small, so that a reproduced signal having high strength (C/N ratio) cannot be obtained Moreover, it becomes difficult to control the thickness of the first recording layer 31 and the second recording layer 32.

Therefore, in this embodiment, the first recording layer 31 and the second recording layer 32 are formed so that the total thickness thereof is from 2 nm to 40 nm. In order to obtain a reproduced signal having higher strength (C/N ratio) and further decrease the noise level of the reproduced signal, the total thickness of the first recording layer 31 and the second recording layer 32 is preferably from 2 nm to 30 nm and more preferably 2 nm to 20 nm.

The individual thicknesses of the first recording layer 31 and the second recording layer 32 are not particularly limited but in order to considerably improve the recording sensitivity and greatly increase the change in reflection coefficient between before and after irradiation with the laser beam L10, the thickness of the first recording layer 31 is preferably from 1 nm to 30 nm and the thickness of the second recording layer 32 is preferably from 1 nm to 30 nm. Further, it is preferable to define the ratio of the thickness of the first recording layer 31 to the thickness of the second recording layer 32 (thickness of first recording layer 31/thickness of second recording layer 32) to be from 0.2 to 5.0.

The light transmission layer 16 serves to transmit a laser beam L10 and preferably has a thickness of 10 μm to 300 μm. More preferably, the light transmission layer 16 has a thickness of 50 μm to 150 μm.

The material used to form the light transmission layer 16 is not particularly limited but in the case where the light transmission layer 16 is to be formed by the spin coating process or the like, ultraviolet ray curable resin, electron beam curable resin or the like is preferably used. More preferably, the light transmission layer 16 is formed of ultraviolet ray curable resin.

The light transmission layer 16 may be formed by adhering a sheet made of light transmittable resin to the surface of the first dielectric layer 15 using an adhesive agent.

The optical recording medium 10 having the above-described configuration can, for example, be fabricated in the following manner.

The reflective layer 12 is first formed on the surface of the substrate 11 formed with the grooves 11a and lands 11b.

The reflective layer 12 can be formed by a gas phase growth process using chemical species containing elements for forming the reflective layer 12. Illustrative examples of the gas phase growth processes include vacuum deposition process, sputtering process and the like.

The second dielectric layer 13 is then formed on surface of the reflective layer 12.

The second dielectric layer 13 can be also formed by a gas phase growth process using chemical species containing elements for forming the second dielectric layer 13. Illustrative examples of the gas phase growth processes include vacuum deposition process, sputtering process and the like.

The second recording layer 32 is further formed on the second dielectric layer 13. The second recording layer 32 can be also formed by a gas phase growth process using chemical species containing elements for forming the second recording layer 32.

The first recording layer 31 is then formed on the second recording layer 32. The first recording layer 31 can be also formed by a gas phase growth process using chemical species containing elements for forming the first recording layer 31.

In this embodiment, since the first recording layer 31 and the second recording layer 32 are formed so that the total thickness thereof is from 2 nm to 40 nm, it is possible to improve the surface smoothness of the first recording layer 31.

The first dielectric layer 15 is then formed on the first recording layer 31. The first dielectric layer 15 can be also formed by a gas phase growth process using chemical species containing elements for forming the first dielectric layer 15.

Finally, the light transmission layer 16 is formed on the first dielectric layer 15. The light transmission layer 16 can be formed, for example, by applying an acrylic ultraviolet ray curable resin or epoxy ultraviolet ray curable resin adjusted to an appropriate viscosity onto the surface of the second dielectric layer 15 by spin coating to form a coating layer and irradiating the coating layer with ultraviolet rays to cure the coating layer.

Thus, the optical recording medium 10 was fabricated.

Data are recorded in the optical recording medium 10 of the above-described configuration, in the following manner, for example.

As shown in FIGS. 1 and 2(a), the first recording layer 31 and the second recording layer 32 are first irradiated via the light transmission layer 16 with a laser beam L10 having predetermined power.

In order to record data with high recording density, it is preferable to project a laser beam L10 having a wavelength λ of 450 nm or shorter onto the optical recording medium 10 via an objective lens (not shown) having a numerical aperture NA of 0.7 or more and it is more preferable that λ/NA be equal to or smaller than 640 nm.

In this embodiment, a laser beam L10 having a wavelength λ of 405 nm is projected onto the optical recording medium 10 via an objective lens having a numerical aperture NA of 0.85.

As shown in FIG. 2(b), this results in formation at the region irradiated with the laser beam L10 of a mixed region M composed of a mixture of the primary component element of the first recording layer 31 and the primary component element of the second recording layer 32.

In order to quickly mix the primary component element of the first recording layer 31 and the primary component element of the second recording layer 32 and form the mixed region M, it is preferable to set the power of the laser beam L10 to be equal to or higher than 1.5 mW at the surface of the light transmission layer 16.

When the primary component elements of the first recording layers 31 and 32 are mixed, the reflection coefficient of the region markedly changes. Since the reflection coefficient of the thus formed mixed region M is therefore greatly different from that of the region surrounding the mixed region M, it is possible to obtain a high reproduced signal (C/N ratio) when optically recorded information is reproduced.

When the laser beam L10 is projected, the first recording layer 31 and the second recording layer 32 are heated by the laser beam L10. In this embodiment, however, the first dielectric layer 15 and the second dielectric layer 13 are disposed outward of the first recording layer 31 and the second recording layer 32. Deformation of the substrate 11 and the light transmission layer 16 by heat is therefore effectively prevented.

According to this embodiment, the first recording layer 31 contains an element selected from the group consisting of Si, Ge, C, Sn, Zn and Cu as a primary component and the second recording layer 32 contains Al as a primary component. When the laser beam L10 of predetermined power is projected onto the first recording layer 31 and the second recording layer 32 via the light transmission layer 16, the element contained in the first recording layer 31 as a primary component and the element contained in the second recording layer 32 as a primary component are mixed at the region irradiated with the laser beam L10 and, as shown in FIG. 2(b), a mixed region M composed of a mixture of the primary component element of the first recording layer 31 and the primary component element of the second recording layer 32 is formed. Since the reflection coefficient of the thus formed mixed region M is therefore greatly different from that of the region surrounding the mixed region M, it is possible to obtain a high reproduced signal (C/N ratio) when optically recorded information is reproduced.

Further, the surface smoothness of the first recording layer 31 irradiated with the laser beam L10 becomes worse as the total thickness of the first recording layer 31 and the second recording layer 32 becomes thicker. As a result, the noise level of the reproduced signal becomes higher and recording sensitivity is lowered. On the other hand, in the case where the total thickness of the first recording layer 31 and the second recording layer 32 is too small, the change in reflection coefficient between before and after irradiation with the laser beam L10 is so small that a reproduced signal having high strength (C/N ratio) cannot be obtained. Moreover, it becomes difficult to control the thickness of the first recording layer 31 and the second recording layer 32. However, according to this embodiment, since the first recording layer 31 and the second recording layer 32 are formed so that the total thickness thereof is from 2 nm to 40 nm, the surface smoothness of the first recording layer 31 can be improved. Therefore, it is possible to reduce the noise level of the reproduced signal, improve the recording sensitivity and further obtain a reproduced signal having high strength (C/N ratio).

Moreover, according to this embodiment, since the element contained in the first recording layer 31 as a primary component and the element contained in the second recording layer 32 as a primary component put only a light load on the environment, there is no risk of harm to the global atmosphere.

Furthermore, according to this embodiment, since the second recording layer 32 contains Al as a primary component, the reflectance of the second recording layer 32 is higher than that of the first recording layer 31 and, therefore, the recording sensitivity of the optical recording medium 10 can be improved.

WORKING EXAMPLES AND COMPARATIVE EXAMPLES

Hereinafter, working examples and comparative examples will be set out in order to further clarify the advantages of the present invention.

WORKING EXAMPLE 1

An optical recording medium was fabricated in the following manner.

A polycarbonate substrate having a thickness of 1.1 mm and a diameter of 120 mm was first set on a sputtering apparatus. Then, a second dielectric layer containing a mixture of ZnS and $SiO_2$ and having a thickness of 60 nm, a second recording layer containing Al as a primary component and having a thickness of 6 nm, a first recording layer containing Si as a primary component and having a thickness of 6 nm and a first dielectric layer containing the mixture of ZnS and $SiO_2$ and having a thickness of 60 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Further, the first dielectric layer was coated using the spin coating method with a resin solution prepared by dissolving acrylic ultraviolet ray curable resin in a solvent to form a coating layer and the coating layer was irradiated with ultraviolet rays, thereby curing the acrylic ultraviolet ray curable resin to form a light transmission layer having a thickness of 100 μm.

WORKING EXAMPLE 2

An optical recording medium was fabricated in the manner of Working Example 1, except that a first recording layer containing Ge as the primary component was formed.

WORKING EXAMPLE 3

An optical recording medium was fabricated in the manner of Working Example 1, except that a first recording layer containing C as the primary component was formed.

WORKING EXAMPLE 4

An optical recording medium was fabricated in the manner of Working Example 1, except that a first recording layer containing Sn as a primary component was formed.

WORKING EXAMPLE 5

An optical recording medium was fabricated in the manner of Working Example 1, except that a first recording layer containing Au as the primary component was formed.

WORKING EXAMPLE 6

An optical recording medium was fabricated in the manner of Working Example 1, except that a first recording layer containing Zn as the primary component was formed.

WORKING EXAMPLE 7

An optical recording medium was fabricated in the manner of Working Example 1, except that a first recording layer containing Al as a primary component and a second recording layer containing Si as a primary component were formed.

WORKING EXAMPLE 8

An optical recording medium was fabricated similarly to Working Example 1, except that a first recording layer containing Al as a primary component and a second recording layer containing Ge as a primary component were formed.

WORKING EXAMPLE 9

An optical recording medium was fabricated similarly to Working Example 1, except that a first recording layer containing Al as a primary component and a second recording layer containing C as a primary component were formed.

WORKING EXAMPLE 10

An optical recording medium was fabricated similarly to Working Example 1, except that a first recording layer containing Al as a primary component and a second recording layer containing Sn as a primary component were formed.

WORKING EXAMPLE 11

An optical recording medium was fabricated similarly to Working Example 1, except that a first recording layer containing Al as a primary component and a second recording layer containing Au as a primary component were formed.

WORKING EXAMPLE 12

An optical recording medium was fabricated similarly to Working Example 1, except that a first recording layer containing Al as a primary component and a second recording layer containing Zn as a primary component were formed.

WORKING EXAMPLE 13

An optical recording medium was fabricated similarly to Working Example 1, except that a first recording layer containing Al as a primary component and a second recording layer containing Cu as a primary component were formed.

Comparative Example 1

An optical recording medium was fabricated in the manner of Working Example 1, except that a first recording layer containing W as a primary component was formed.

Comparative Example 2

An optical recording medium was fabricated in the manner of Working Example 1, except that a first recording layer containing Al as a primary component and a second recording layer containing W as a primary component were formed.

Data were recorded in the optical recording media fabricated in Working Examples 1 to 13 and Comparative Examples 1 and 2 in the following manner.

Specifically, the optical recording media fabricated in accordance with Working Examples 1 to 13 and Comparative Examples 1 and 2 were sequentially set in a DDU1000 optical recording medium evaluation apparatus manufactured by Pulstec Industrial Co., Ltd. and data was optically recorded therein under the following conditions.

A blue laser beam having a wavelength of 405 nm was employed as the laser beam for recording data and the laser beam was condensed onto each of the optical recording media via the light transmission layer using an objective lens whose numerical aperture was 0.85, and data were optically recorded therein under the following recording signal conditions.

The optical recording of data was conducted by varying the power of the laser beam for each optical recording medium of the respective Working Examples and Comparative Examples.

The recording signal conditions were as follows.

Modulation Code: (1.7) RLL
Channel Bit Length: 0.12 μm
Recording Linear Velocity: 5.3 m/sec
Channel Clock: 66 MHz
Recording Signal: 8 T Data recorded in each of the optical recording media were then reproduced using the optical recording medium evaluation apparatus mentioned above and the C/N ratio of the reproduced signal was measured. When data were reproduced, the wavelength of the laser beam was set at 405 nm, the numerical aperture of the objective lens was set at 0.85 and the power of the laser beam was set at 0.3 mW. The power of the laser beam was defined as the power of the laser beam on the surface of the light transmission layer.

Thus, the maximum C/N ratio and the power of the laser beam at which the reproduced signal having the maximum C/N ratio was obtained were measured for each of the optical recording media.

The measurement results are shown in Table 1.

The maximum power of the laser beam of the optical recording medium evaluating apparatus used for the experiment was 10.0 mW. Therefore, when the C/N ratio did not saturate even though the power of the laser beam was increased up to 10.0 mW, it was deemed that the power of the laser at which the reproduced signal having the maximum C/N ratio would be obtained exceeded 10.0 mW. This is indicated by designating the power value of the laser beam as 10.0 mW affixed with an asterisk.

TABLE 1

| | First Recording Layer | Second Recording Layer | 8 T C/N (dB) | Judgement | Laser Power (mW) | Judgement |
|---|---|---|---|---|---|---|
| Working Example 1 | Si | Al | 50.9 | ◉ | 9 | ◉ |
| Working Example 2 | Ge | Al | 51.7 | ◉ | 7 | ◉ |
| Working Example 3 | C | Al | 46.0 | ◉ | 10* | ○ |
| Working Example 4 | Sn | Al | 44.7 | ◉ | 10* | ○ |
| Working Example 5 | Au | Al | 43.2 | ◉ | 8 | ◉ |
| Working Example 6 | Zn | Al | 43.8 | ◉ | 10* | ○ |
| Working Example 7 | Al | Si | 52.8 | ◉ | 10* | ○ |
| Working Example 8 | Al | Ge | 45.0 | ◉ | 10* | ○ |
| Working Example 9 | Al | C | 47.2 | ◉ | 8 | ◉ |
| Working Example 10 | Al | Sn | 43.2 | ◉ | 10* | ○ |
| Working Example 11 | Al | Au | 48.4 | ◉ | 8 | ◉ |
| Working Example 12 | Al | Zn | 31.6 | ○ | 10* | ○ |
| Working Example 13 | Al | Cu | 18.7 | ○ | 9 | ◉ |
| Comparative Example 1 | W | Al | Unmeasurable | x | 10* | — |
| Comparative Example 2 | Al | W | Unmeasurable | x | 10* | — |

As apparent from Table 1, it was found that the C/N ratio of the reproduced signal could be measured in each of the optical recording media fabricated in accordance with Working Examples 1 to 13. Particularly, the C/N ratio of the reproduced signal exceeded 40 dB in each of the optical recording media fabricated in accordance with Working Examples 1 to 11, while the C/N ratio of the reproduced signal exceeded 50 dB in each of the optical recording media fabricated in accordance with Working Examples 1, 2 and 7, demonstrating that these optical recording media had particularly excellent recording and reproducing characteristics.

To the contrary, in each of the optical recording media fabricated in accordance with Comparative Examples 1 and 2, it was found that the C/N ratio of the reproduced signal could not be measured and it was difficult to record and reproduce data.

Further, the power of the laser beam at which the reproduced signal having the maximum C/N ratio was obtained was less than 10 mW in each of the optical recording media fabricated in accordance with Working Examples 1, 2, 5, 9, 11 and 13, demonstrating that the optical recording media fabricated in accordance with Working Examples 1, 2, 5, 9, 11 and 13 had excellent recording sensitivity.

WORKING EXAMPLE 14

An optical recording medium was fabricated similarly to Working Example 1, except that a second recording layer having a thickness of 10 nm and a first recording layer having a thickness of 10 nm were formed.

WORKING EXAMPLE 15

An optical recording medium was fabricated similarly to Working Example 1, except that a second recording layer having a thickness of 20 nm and a first recording layer having a thickness of 20 nm were formed.

Comparative Example 3

An optical recording medium was fabricated similarly to Working Example 1, except that a second recording layer having a thickness of 50 nm and a first recording layer having a thickness of 50 nm were formed.

Similarly to the case where data were optically recorded in each of the optical recording media fabricated in accordance with Working Examples 1 to 13 and Comparative Examples 1 and 2, data were optically recorded in each of the optical recording media fabricated in accordance with Working Examples 14 and 15 and Comparative Example 3 and the C/N ratio of an 8T signal was measured for each of the optical recording media fabricated in accordance with Working Examples 14 and 15 and Comparative Example 3. The power of the laser beam was fixed to be 10 mW.

Figure 3:
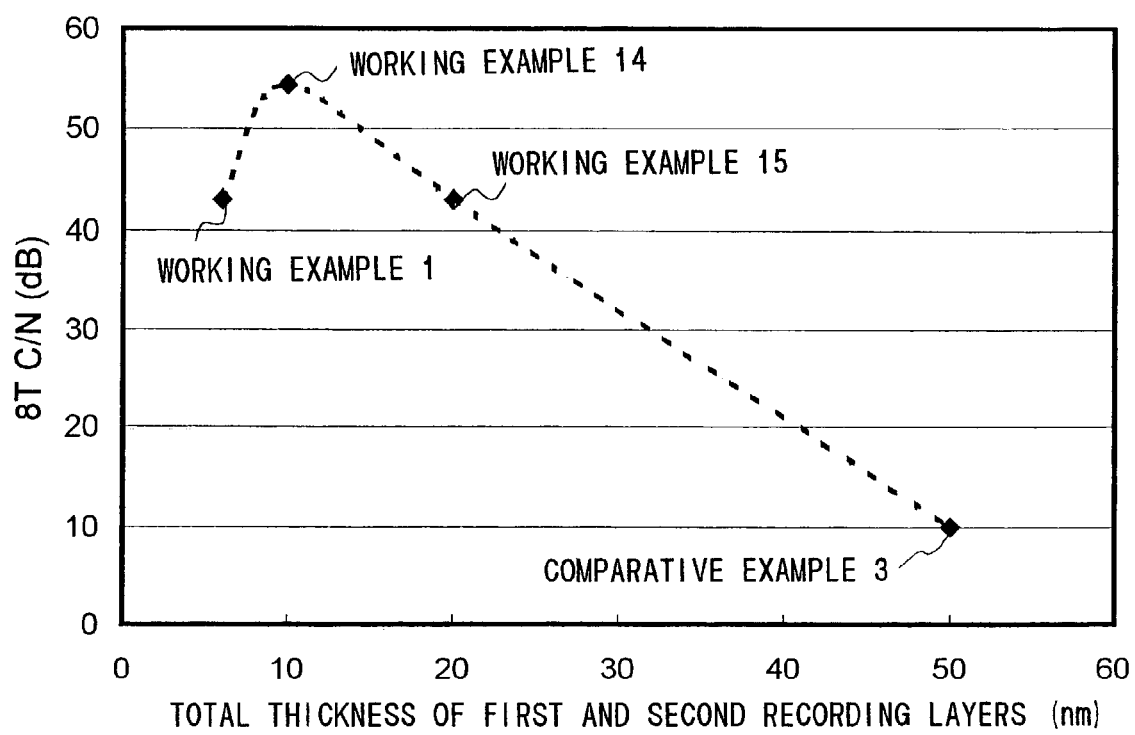
FIG. 3 is a graph showing how C/N ratio varies with total thickness of a first recording layer and a second recording layer.

The measurement results are shown in FIG. 3.

As shown in FIG. 3, in the case where the power of the laser beam used for recording data was 10 mW, it was found that the C/N ratio of the reproduced signal obtained from the optical recording medium fabricated in accordance with Working Example 14 and formed with the first recording layer and the second recording layer having a total thickness of 20 nm was highest and that the C/N ratio of the reproduced signal became lower than 40 dB if the total thickness of the first recording layer and the second recording layer exceeded 40 nm.

WORKING EXAMPLE 16

An optical recording medium was fabricated in the following manner.

A polycarbonate substrate having a thickness of 1.1 mm and a diameter of 120 mm was first set on a sputtering apparatus. Then, a reflective layer containing a mixture of Ag, Pd and Cu and having a thickness of 100 nm, a second dielectric layer containing a mixture of ZnS and $SiO_2$ and having a thickness of 28 nm, a second recording layer containing Al as a primary component and having a thickness of 5 nm, a first recording layer containing Si as a primary component and having a thickness of 5 nm and a first dielectric layer containing the mixture of ZnS and $SiO_2$ and having a thickness of 22 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Further, the first dielectric layer was coated using the spin coating method with a resin solution prepared by dissolving acrylic ultraviolet ray curable resin in a solvent to form a coating layer and the coating layer was irradiated with ultraviolet rays, thereby curing the acrylic ultraviolet ray curable resin to form a light transmission layer having a thickness of 100 μm.

WORKING EXAMPLE 17

An optical recording medium was fabricated in the manner of Working Example 16, except that a second recording layer containing Mg as the primary component was formed.

Further, two optical recording media were similarly fabricated, except that the amount of Mg added to the second recording layer was varied.

WORKING EXAMPLE 18

An optical recording medium was fabricated in the manner of Working Example 16, except that a second recording layer containing Au as the primary component was formed.

Further, three optical recording media were similarly fabricated, except that the amount of Au added to the second recording layer was varied.

WORKING EXAMPLE 19

An optical recording medium was fabricated in the manner of Working Example 16, except that a second recording layer containing Ti as the primary component was formed.

Further, three optical recording medium were similarly fabricated, except that the amount of Ti added to the second recording layer was varied.

WORKING EXAMPLE 20

An optical recording medium was fabricated in the manner of Working Example 16, except that a second recording layer containing Cu as the primary component was formed.

Further, three optical recording media were similarly fabricated, except that the amount of Cu added to the second recording layer was varied.

The noise of an unrecorded region of each of the optical recording media fabricated in accordance with Working Examples 16 to 20 was measured at frequency bands of 16.5 MHz and 4.1 MHz.

The measurement results for the optical recording media fabricated in accordance with Working Examples 17 to 20 are shown in FIGS. 4 to 7, respectively In FIGS. 4 to 7, data at 0 atomic % of the amount of the added element correspond to data of the optical recording medium fabricated in accordance with Working Example 16.

Figure 4:
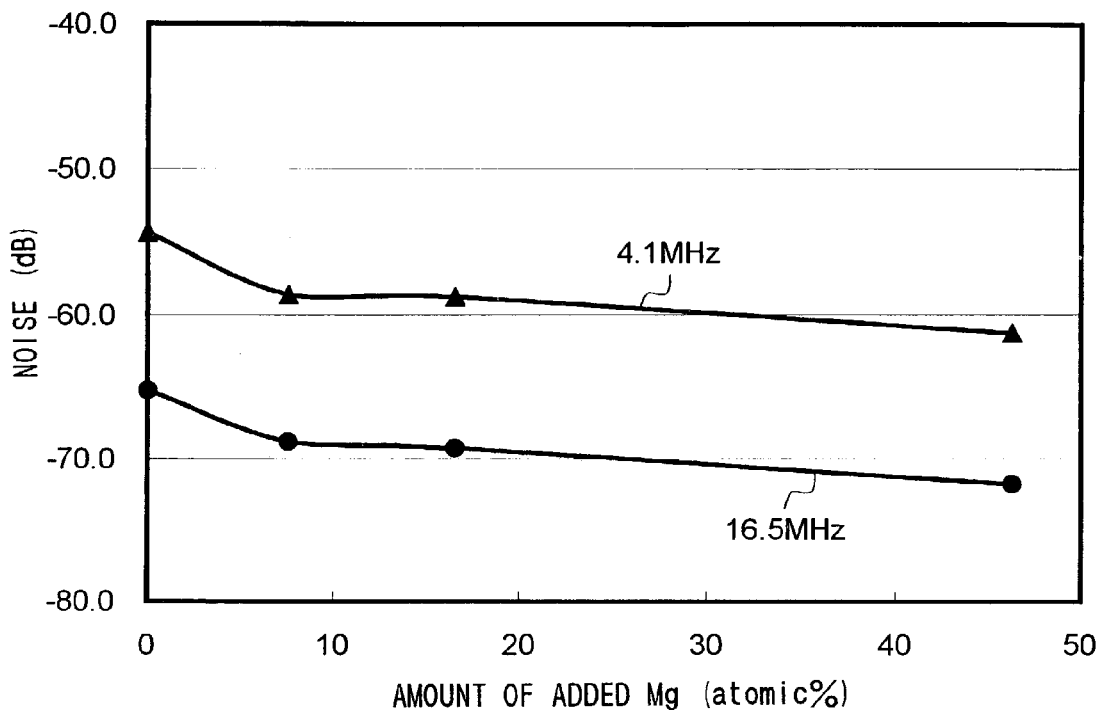
FIG. 4 is a graph showing how noise level varies with amount of Mg added to a second recording layer.

As shown in FIG. 4, it was found that when Mg was added to the second recording layer, the noise level at the frequency bands of 16.5 MHz and 4.1 MHz was lowered. Further, it was found that at both the frequency bands of 16.5 MHz and 4.1 MHz, in the case where the amount of Mg added to the second recording layer was equal to or less than about 8 atomic %, the noise level was notably decreased by addition of Mg but that in the case where the amount of Mg added to the second recording layer exceeded about 8 atomic %, the noise level was only slightly decreased by further addition of Mg.

Figure 5:
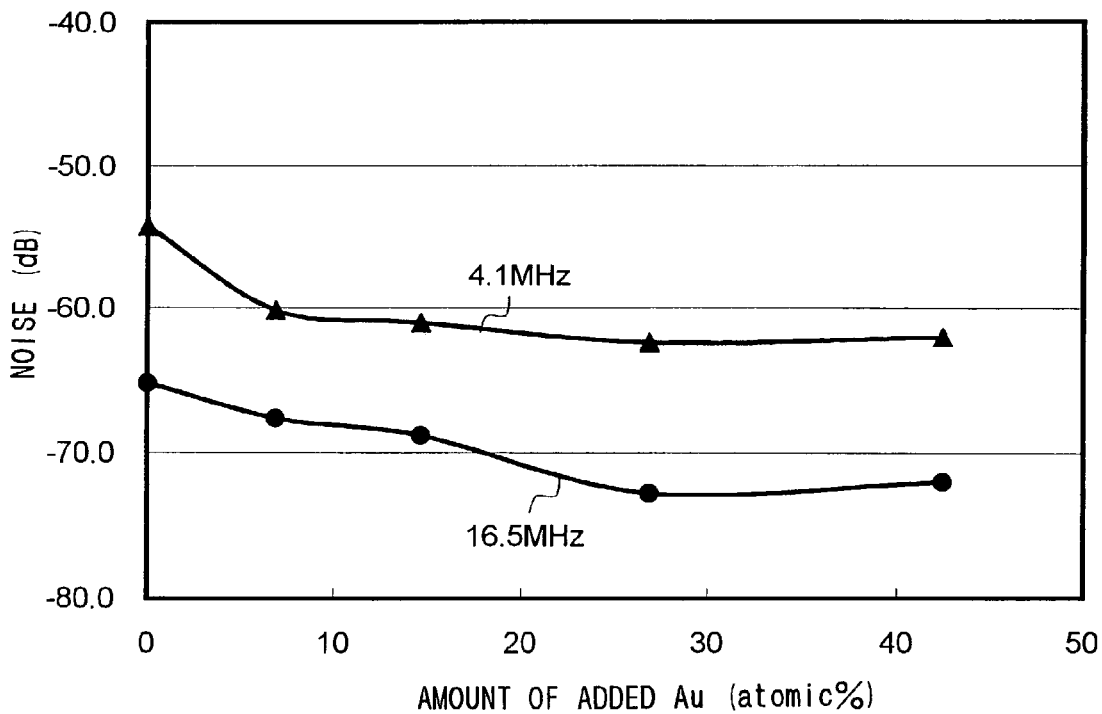
FIG. 5 is a graph showing how noise level varies with amount of Au added to a second recording layer.

As shown in FIG. 5, it was found that when Au was added to the second recording layer, the noise level at the frequency bands of 16.5 MHz and 4.1 MHz was lowered. Further, it was found that at the frequency band of 4.1 MHz, in the case where the amount of Au added to the second recording layer was equal to or less than about 7 atomic %, the noise level was notably decreased by addition of Au but that in the case where the amount of Au added to the second recording layer exceeded about 7 atomic %, the noise level was only slightly decreased by further addition of Au. To the contrary, it was found that at the frequency band of 16.5 MHz, in the case where the amount of Au added to the second recording layer was equal to or less than about 27 atomic %, the noise level was notably decreased by addition of Au but that in the case where the amount of Au added to the second recording layer exceeded about 27 atomic %, the noise level was only slightly decreased by further addition of Au.

Figure 6:
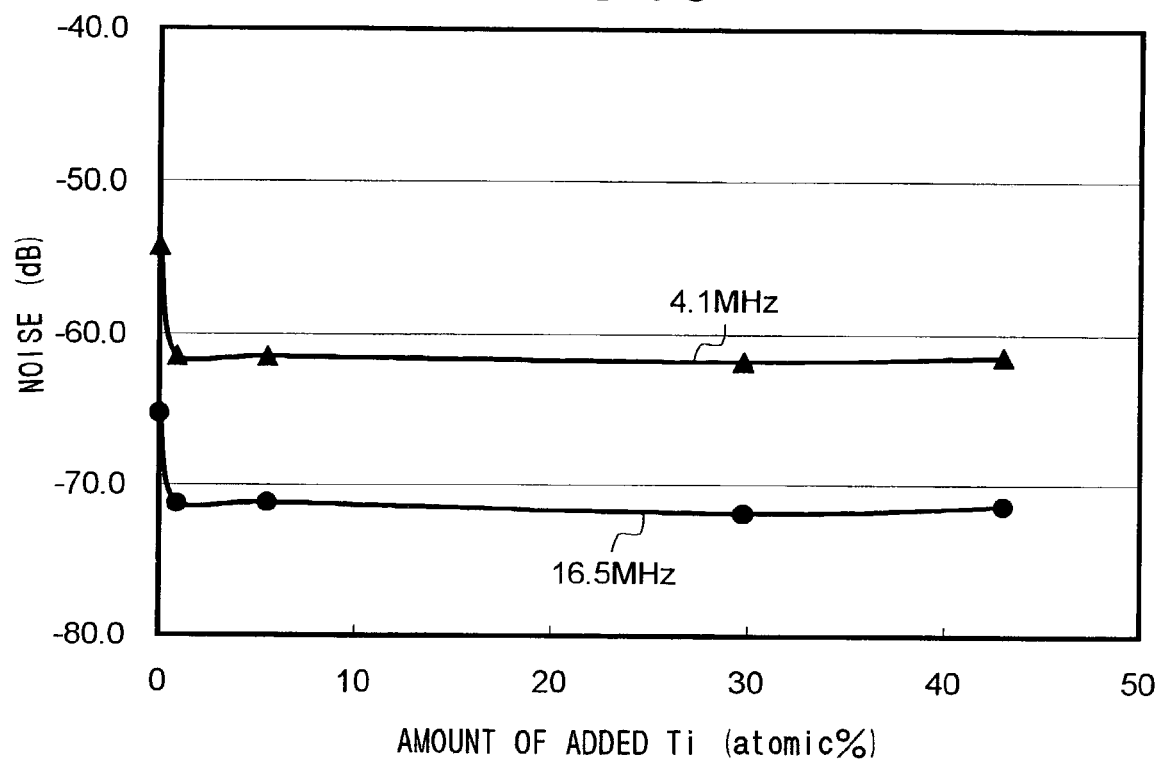
FIG. 6 is a graph showing how noise level varies with amount of Ti added to a second recording layer.

As shown in FIG. 6, it was found that when Ti was added to the second recording layer, the noise level at the frequency bands of 16.5 MHz and 4.1 MHz was lowered. Further, it was found that at both the frequency bands of 16.5 MHz and 4.1 MHz, in the case where the amount of Ti added to the second recording layer was equal to or less than about 1 atomic %, the noise level was notably decreased by addition of Ti but that in the case where the amount of Ti added to the second recording layer exceeded about 1 atomic %, the noise level was only slightly decreased by further addition of Ti.

Figure 7:
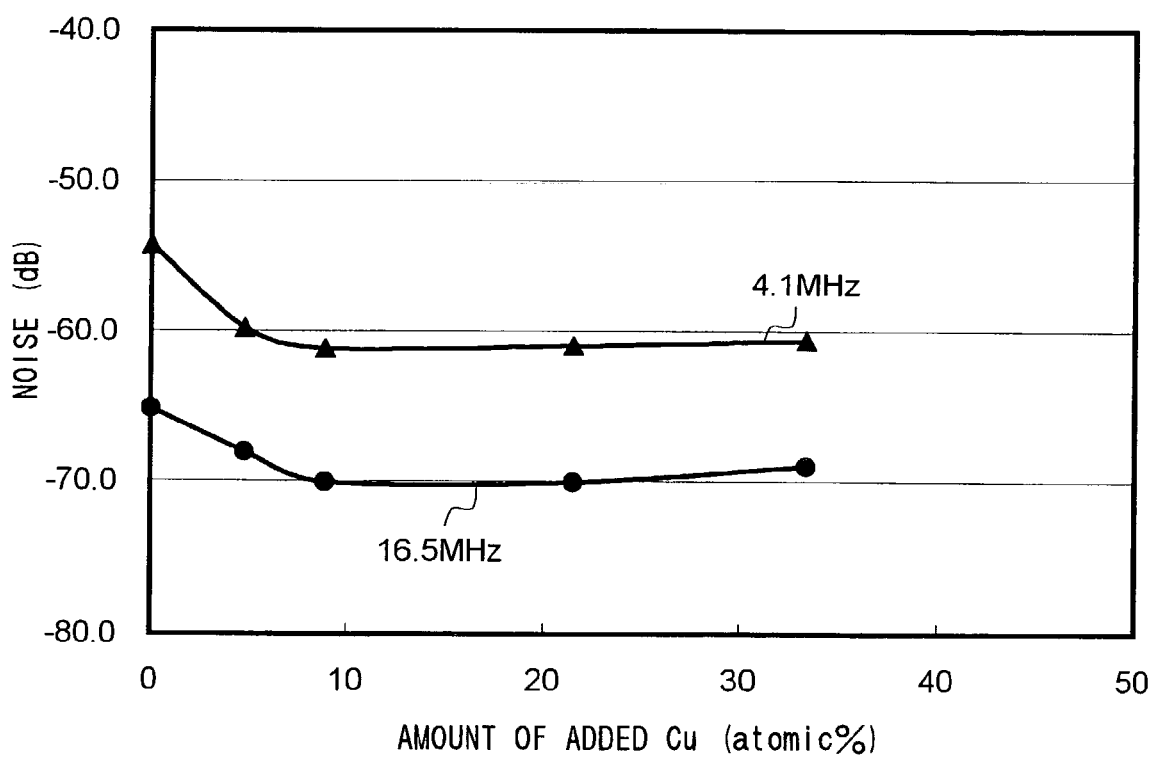
FIG. 7 is a graph showing how noise level varies with amount of Cu added to a second recording layer.

As shown in FIG. 7, it was found that when Cu was added to the second recording layer, the noise level at the frequency bands of 16.5 MHz and 4.1 MHz was lowered. Further, it was found that at both the frequency bands of 16.5 MHz and 4.1 MHz, in the case where the amount of Cu added to the second recording layer was equal to or less than about 9 atomic %, the noise level was notably decreased by addition of Cu but that in the case where the amount of Cu added to the second recording layer exceeded about 9 atomic %, the noise level was only slightly decreased by further addition of Cu.

Further, the reflection coefficient of an unrecorded region of each of the optical recording media fabricated in accordance with Working Examples 16 to 20 was measured. The reflection coefficients were measured using a laser beam having power of 0.3 mW.

Then, in order to determine the reliability of the optical recording media in the environment where they would be actually used, they were held in a much severer environment than the severest they would be expected to encounter in actual application. Specifically, the optical recording media fabricated in accordance with Working Examples 16 to 20 were subjected to a storage test in which they were held at a temperature of 80° C. and relative humidity of 85 % for 50 hours. Following this test, the noise level and reflection coefficient of an unrecorded region of each of them were again measured and the rate of reflection coefficient reduction was calculated.

Figure 8:
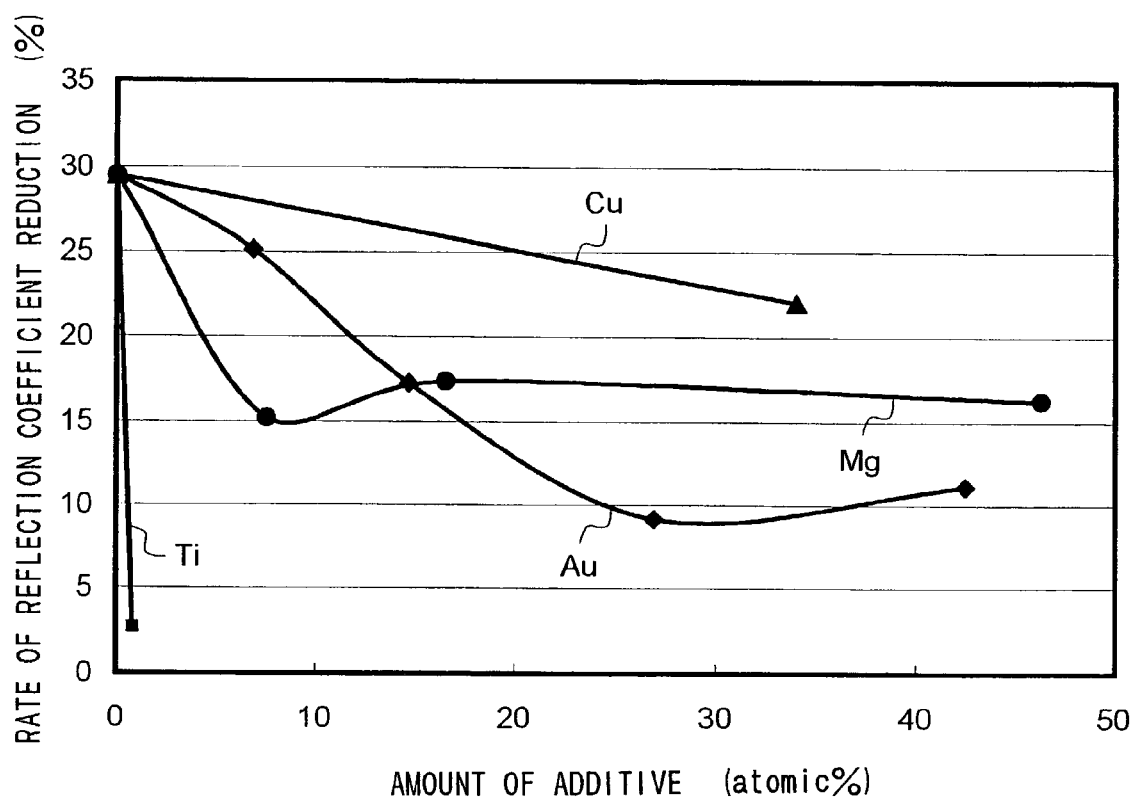
FIG. 8 is a graph showing how rate of reflection coefficient reduction varies with the kind and amount of an element added to a second recording layer.

The measurement results are shown in FIG. 8.

As shown in FIG. 8, it was found that the rate of reflection coefficient reduction after the storage test was small in the optical recording media of Working Examples 17 to 20 having the second recording layers to which Mg, Au, Ti or Cu was added, while the rate of reflection coefficient reduction after the storage test was about 30% in the optical recording medium of Working Example 16 having the second recording layer which contains Al as a primary component and to which Mg, Au, Ti or Cu was not added.

Further, it was found that as the amount of Mg, Au, Ti or Cu added to the second recording layer was increased, the rate of reflection coefficient reduction became smaller. Particularly, in the optical recording medium of Working Example 19 to which Ti was added, it was found that the rate of reflection coefficient reduction could be markedly suppressed by adding a small amount of Ti to the second recording layer.

WORKING EXAMPLE 21

An optical recording medium sample #A-1 was fabricated in the following manner.

A polycarbonate substrate having a thickness of 0.6 mm and a diameter of 120 mm was first set on a sputtering apparatus. Then, a second dielectric layer containing a mixture of ZnS and $SiO_2$ and having a thickness of 60 nm, a second recording layer containing Al as a primary component and having a thickness of 5 nm, a first recording layer containing Si as a primary component and having a thickness of 5 nm and a first dielectric layer containing the mixture of ZnS and $SiO_2$ and having a thickness of 60 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Then, a polycarbonate board having a thickness of 0.6 mm and a diameter of 120 mm was adhered to the surface of the first dielectric layer to form a light transmission layer, thereby fabricating an optical recording medium sample #A-1.

An optical recording medium sample #A-2 was fabricated in the same manner of the optical recording medium sample #A-1, except that a first recording layer having a thickness of 10 nm and a second recording layer having a thickness of 10 nm were formed.

Further, an optical recording medium sample #A-3 was fabricated in the same manner of the optical recording medium sample #A-1, except that a first recording layer having a thickness of 20 nm and a second recording layer having a thickness of 20 nm were formed.

Comparative Example 4

An optical recording medium sample #A-4 was fabricated in the same manner of the optical recording medium sample #A-1, except that a first recording layer having a thickness of 50 nm and a second recording layer having a thickness of 50 nm were formed.

WORKING EXAMPLE 22

Optical recording medium samples #B-1, #B-2 and #B-3 were fabricated in the manner of Working Example 21, except that a first recording layer containing Al as a primary component and a second recording layer containing Si as a primary component were formed.

Comparative Example 5

An optical recording medium sample #B-4 was fabricated in the manner of Comparative Example 4, except that a first recording layer containing Si as a primary component and a second recording layer containing Al as a primary component were formed.

Then, a laser beam having a wavelength of 635 nm and condensed by an objective lens having a numerical aperture of 0.6 was projected onto each of the optical recording medium samples #A-1, #A-2, #A-3, #A-4, #B-1, #B-2, #B-3 and #B-4 from the side of the light transmission layer formed by adhering the polycarbonate board and noise at the frequency bands of 16.5 MHz and 4.1 MHz of an unrecorded region of each of the optical recording medium samples was measured at a linear rate of 5.3 m/sec.

The power of the laser beam was 1.0 mW.

Figure 9:
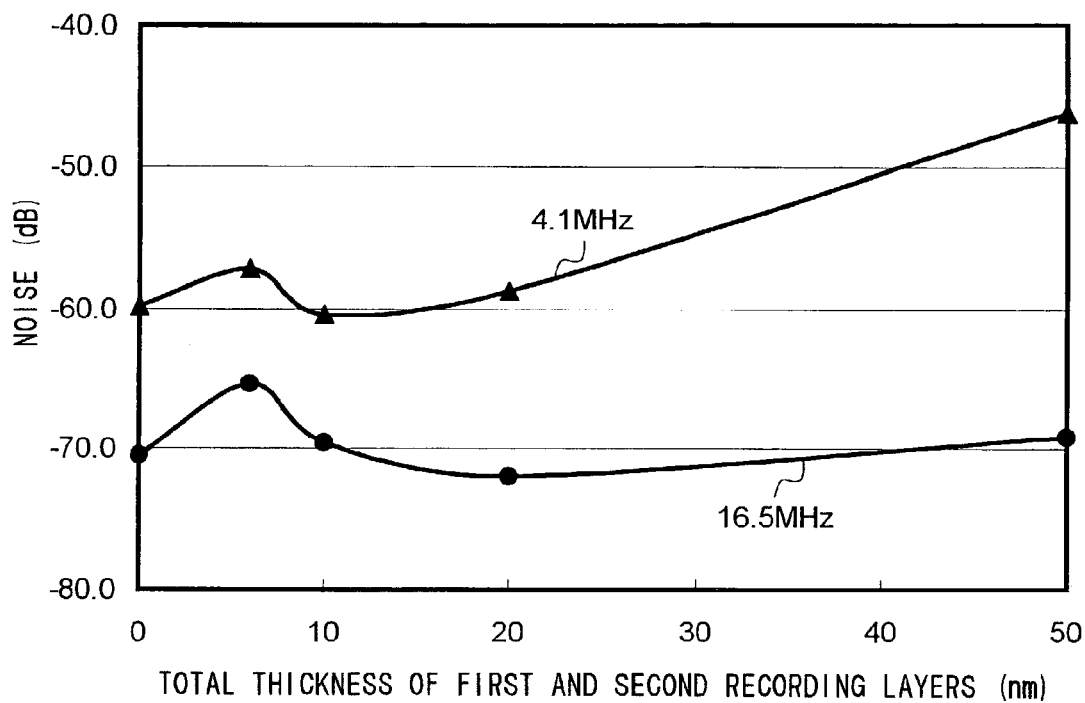
FIG. 9 is a graph showing how noise level varied with total thickness of a first recording layer and a second recording layer when optical recording medium samples fabricated in accordance with Working Example 21 and Comparative Example 4 were irradiated with a laser beam to record data therein.
Figure 10:
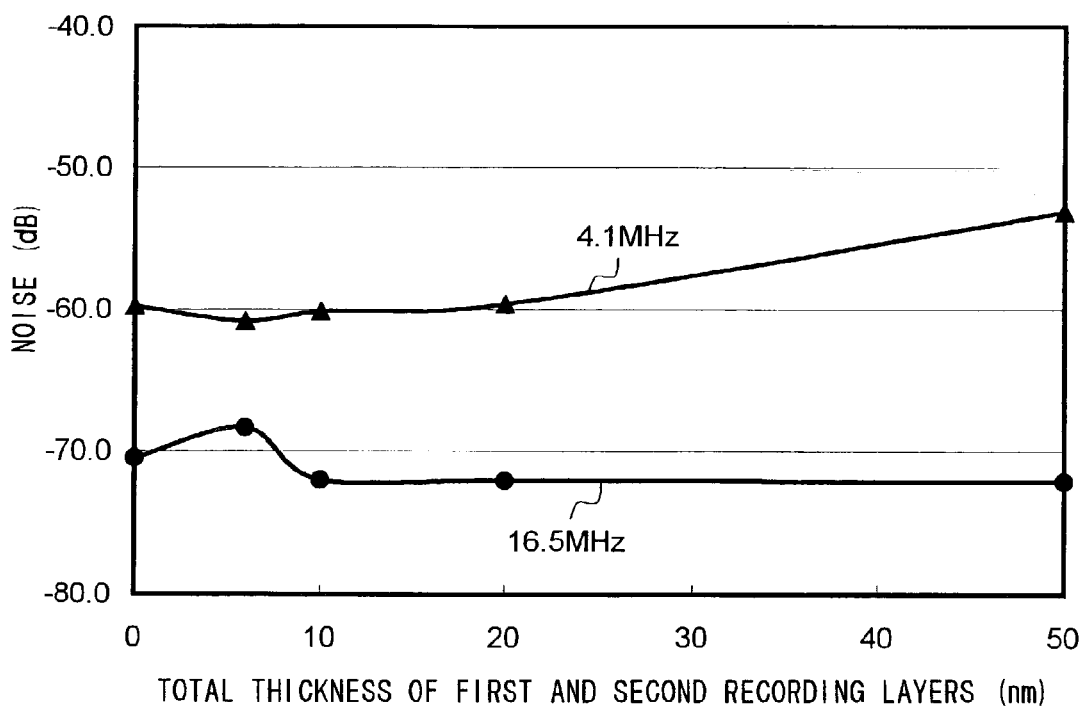
FIG. 10 is a graph showing how noise level varied with total thickness of a first recording layer and a second recording layer when optical recording medium samples fabricated in accordance with Working Example 22 and Comparative Example 5 were irradiated with a laser beam to record data therein.

The measurement results for Working Example 21 and Comparative Example 4 are shown in FIG. 9 and the measurement results for Working Example 22 and Comparative Example 5 are shown in FIG. 10.

As shown in FIGS. 9 and 10, in the case where data were recorded by projecting the laser beam onto the optical recording medium samples via the light transmission layer formed by adhering the polycarbonate board, in all of Working Example 21, Comparative Example 4, Working Example 22 and Comparative Example 6, it was found that as the first recording layer and the second recording layer became thicker, the noise level at the frequency band of 4.1 MHz of the unrecorded region of each of the optical recording medium samples was increased. It is reasonable to conclude that this was because the surface smoothness became worse as the first recording layer and the second recording layer became thicker.

Comparative Example 6

The optical recording medium samples #A-1, #A-2, #A-3, #A-4, #B-1, #B-2, #B-3 and #B-4 were fabricated in the manner of Working Example 21, Comparative Example 4, Working Example 22 and Comparative Example 5.

Then, noise at the frequency bands of 16.5 MHz and 4.1 MHz of an unrecorded region of each of the optical recording medium samples was measured in the manner of Working Examples 21 and 22, except that the laser beam was projected onto each of optical recording medium samples via the polycarbonate substrate.

Figure 11:
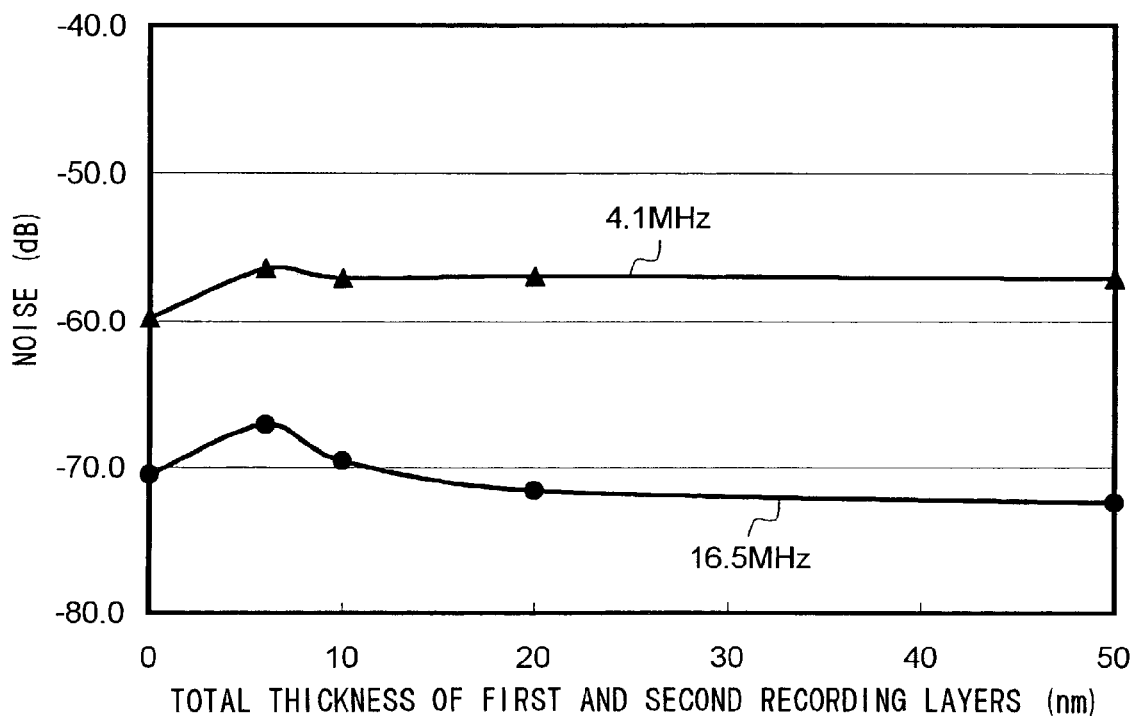
FIG. 11 is a graph showing how noise level varied with total thickness of a first recording layer and a second recording layer when optical recording medium samples fabricated in accordance with Working Example 21 and Comparative Example 4 were irradiated with a laser beam via a polycarbonate substrate to record data therein.
Figure 12:
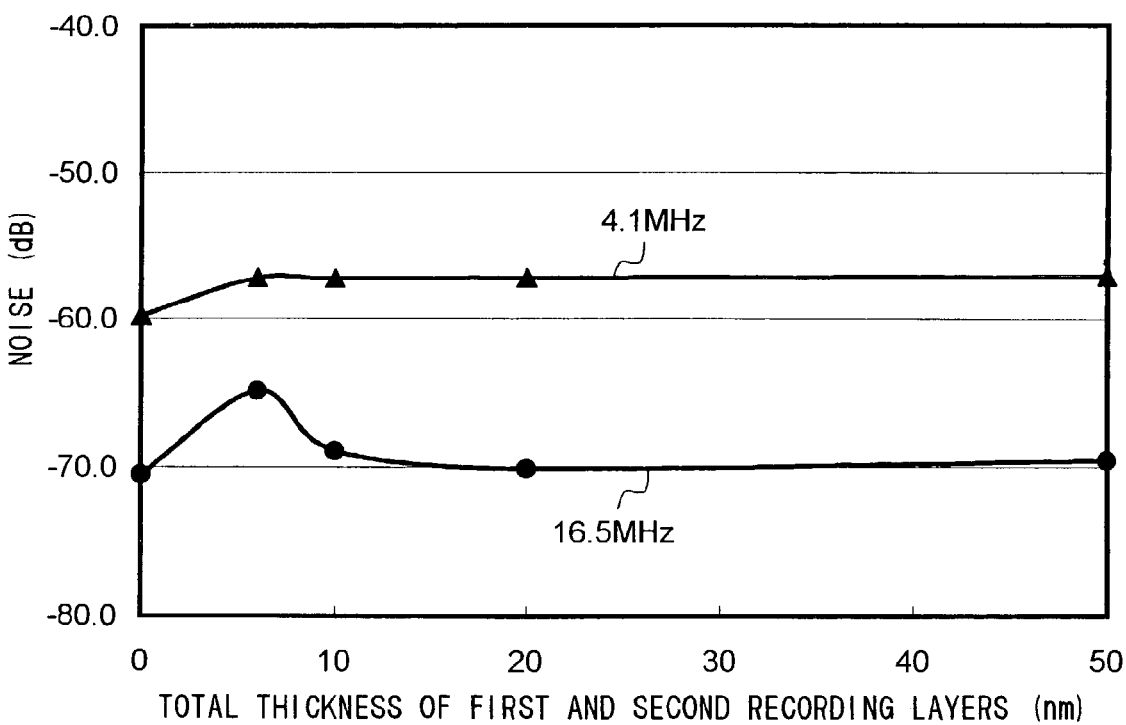
FIG. 12 is a graph showing how noise level varied with total thickness of a first recording layer and a second recording layer when optical recording medium samples fabricated in accordance with Working Example 22 and Comparative Example 5 were irradiated with a laser beam via a polycarbonate substrate to record data therein.

The measurement results of the optical recording medium samples #A-1, #A-2, #A-3 and #A-4 fabricated in accordance with Working Example 21 are shown in FIG. 11 and the measurement results of the optical recording medium samples #B-1, #B-2, #B-3 and #B-4 fabricated in accordance with Working Example 22 are shown in FIG. 12.

As shown in FIGS. 11 and 12, in the case where data were recorded by projecting the laser beam onto the optical recording medium samples via the polycarbonate substrate, no correlation was found between the thicknesses of the first recording layer and the second recording layer and the noise level of the unrecorded region of each of optical recording medium samples. It is reasonable to conclude that this was because the smoothness of the surface of the first recording layer on the side of the polycarbonate substrate did not vary even if the thicknesses of the first recording layer and the second recording layer changed.

The present invention has thus been shown and described with reference to specific embodiments and working examples. However, it should be noted that the present invention is in no way limited to the details of the described arrangements but changes and modifications may be made without departing from the scope of the appended claims.

For example, although the first recording layer 31 and the second recording layer 32 are formed in contact with each other in the above described embodiment and working examples, it is not absolutely necessary to form the first recording layer 31 and the second recording layer 32 in contact with each other but it is sufficient for the second recording layer 32 to be so located in the vicinity of the first recording layer 31 as to enable formation of a mixed region including the primary component element of the first recording layer 31 and the primary component element of the second recording layer 32 when the region is irradiated with a laser beam. Further, one or more other layers such as a dielectric layer may be interposed between the first recording layer 31 and the second recording layer 32.

Furthermore, although the optical recording medium 10 in the above described embodiment and working examples includes the first recording layer 31 and the second recording layer 32, the optical recording medium may include one or more recording layers containing an element selected from the group consisting of Si, Ge, C, Sn, Zn, and Cu as a primary component or one or more recording layers containing Al as a primary element, in addition to the first recording layer 31 and the second recording layer 32.

Moreover, although the first recording layer 31 is disposed on the side of the light transmission layer 16 and the second recording layer 32 is disposed on the side of the substrate 11 in the above described embodiment and working examples, it is possible to dispose the first recording layer 31 on the side of the substrate 11 and the second recording layer 32 on the side of the light transmission layer 16.

Further, the optical recording medium 10 in the above described embodiment and working examples includes the first dielectric layer 15 and the second dielectric layer 13 and the first recording layer 31 and the second recording layer 32 are disposed between the first dielectric layer 15 and the second dielectric layer 13. However, it is not absolutely necessary for the optical recording medium 10 to include the first dielectric layer 15 and the second dielectric layer 13, i.e., the optical recording medium 10 may include no dielectric layer. Further, the optical recording medium 10 may include a single dielectric layer and in such case the dielectric layer may be disposed on either the side of the substrate 11 or the side of the light transmission layer 16 with respect to the first recording layer 31 and the second recording layer 32.

Furthermore, although the first recording layer 31 and the second recording layer 32 are formed so as to have the same thickness in the above described embodiment and working examples, it is not absolutely necessary to form the first recording layer 31 and the second recording layer 32 so as to have the same thickness.

According to the present invention, it is possible to provide an optical recording medium constituted so as to record data therein and reproduce data therefrom by projecting a laser beam onto the side opposite to a substrate, including two or more recording layers and being capable of decreasing a noise level and improving a C/N ratio in a reproduced signal.

Further, according to the present invention, it is possible to provide an optical recording medium which can be fabricated with materials that put minimal load on the environment and has a high long term storage reliability.

Furthermore, according to the present invention, it is possible to provide a method for optically recording data in an optical recording medium which can decrease a noise level and improve a C/N ratio in a reproduced signal.

The invention claimed is:

1. An optical recording medium comprising:
a substrate;
a reflective layer overlying the substrate;
a first recording layer formed overlying the reflective layer and containing Al as a primary component;
a second recording layer disposed on top of and being in contact with the first recording layer and containing an element selected from the group consisting of Si, C, Sn, and Zn as a primary component, the total thickness of the first recording layer and the second recording layer being 2 nm to 20 nm;
a first dielectric layer overlying the second recording layer;
a second dielectric layer being disposed between the reflective layer and both the first and second recording layers; and
a light transmission layer disposed on top of and in contact with the first dielectric layer, the light transmission layer transmitting therethrough an incoming laser beam toward the first recording layer and the second recording layer, the optical recording medium being constituted so as to be irradiated by a laser beam projected onto the light transmission whereby, upon irradiation, the primary component contained in the first recording layer and the primary component contained in the second recording layer are mixed with each other to irreversibly form a mixed region.

2. An optical recording medium in accordance with claim 1 wherein at least one kind of an element selected from the group consisting of Mg, Au, Ti and Cu is added to the first recording layer.

3. An optical recording medium in accordance with claim 1 which is constituted as a write-once type optical recording medium.

4. The optical recording medium according to claim 1 wherein the first dielectric layer has a thickness of between about 3 nm to 200 nm.

5. The optical recording medium according to claim 1 wherein the first dielectric layer has a thickness of about 60 nm.

6. The optical recording medium according to claim 1 wherein the second dielectric layer has a thickness of between about 3 nm to 200 nm.

7. The optical recording medium according to claim 1 wherein the second dielectric layer has a thickness of about 60 nm.

8. A method for optically recording data comprising a step of projecting a laser beam of predetermined power onto the side opposite from a substrate of an optical recording medium comprising the substrate, a first recording layer containing an element selected from the group consisting of Si, C, Sn, and Zn as a primary component, a second recording layer located in the vicinity of the first recording layer and formed overlying the substrate and between the first recording layer and the substrate, the second recording layer containing Al as a primary component, a first dielectric layer overlying the first recording layer, and a second dielectric layer being disposed between the substrate and the second recording layer, a reflective layer provided between the substrate and the second dielectric layer, the optical recording medium being constituted to be irradiated by a laser beam projected onto the side opposite from the substrate, whereby upon irradiation, the primary component contained in the first recording layer and the primary component contained in the second layer are mixed with each other to irreversibly form a mixed region, and the total thickness of the first recording layer and the second recording layer being 2 nm to 20 nm.

9. A method for optically recording data in accordance with claim 8 wherein at least one kind of an element selected from the group consisting of Mg, Au, Ti and Cu is added to the second recording layer.

10. A method for optically recording data in accordance with claim 8 wherein the optical recording medium further comprises a light transmission layer overlying the first dielectric layer.

11. A method for optically recording data, comprising:

projecting a laser beam of predetermined power and having a wavelength of 450 nm or shorter onto the side opposite from a substrate of an optical recording medium comprising the substrate, a first recording layer containing an element selected from the group consisting of Si, C, Sn, and Zn as a primary component, and a second recording layer located in the vicinity of the first recording layer and formed overlying the substrate and between the recording layer and the substrate, the second recording layer containing Al as a primary component, a first dielectric layer overlying the first recording layer, and a second dielectric layer being disposed between the substrate and the second recording layer, a reflective layer provided between the substrate and the second dielectric layer, the optical recording medium being constituted to be irradiated by a laser beam projected onto the side opposite from the substrate, and the total thickness of the first recording layer and the second recording layer being 2 nm to 20 nm; and mixing the primary component contained in the first recording layer and the primary component contained in the second layer with each other upon the irradiation to irreversibly form a mixed region, thereby recording data in the first recording layer and the second recording layer.

12. A method for optically recording data in accordance with claim 11 wherein the optical recording medium is constituted as a write-once type optical recording medium.

13. A method for optically recording data in accordance with claim 11 which comprises steps of employing an objective lens and a laser beam whose numerical aperture NA and wavelength $\lambda$ satisfy $\lambda/NA \leq 640$ nm, and projecting the laser beam onto the optical recording medium via the objective lens, thereby recording data in the first recording layer and the second recording layer.

* * * * *

UNITED STATES PATENT AND TRADEMARK OFFICE
CERTIFICATE OF CORRECTION

PATENT NO.         : 7,479,363 B2                                    Page 1 of 1
APPLICATION NO.    : 10/423686
DATED              : January 20, 2009
INVENTOR(S)        : Kori Mishima et al.

It is certified that error appears in the above-identified patent and that said Letters Patent is hereby corrected as shown below:

Column 22
Line 19, "transmifting" should read --transmitting--.

Column 22
Line 23, "transmission whereby" should read --transmission layer whereby--.

Column 23
Line 18, "recording layer" should read as --first recording layer--.

Signed and Sealed this

Sixteenth Day of February, 2010

David J. Kappos
*Director of the United States Patent and Trademark Office*